(12) United States Patent
Chen et al.

(10) Patent No.: US 10,855,417 B2
(45) Date of Patent: Dec. 1, 2020

(54) CONTROL CHANNEL SIGNALING TECHNIQUES IN WIRELESS SYSTEMS WITH MULTIPLE POSSIBLE TRANSMISSION TIME INTERVALS

(71) Applicant: QUALCOMM Incorporated, San Diego, CA (US)

(72) Inventors: Wanshi Chen, San Diego, CA (US); Shimman Arvind Patel, San Diego, CA (US); Yongbin Wei, La Jolla, CA (US); Aleksandar Damnjanovic, Del Mar, CA (US); Hao Xu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 91 days.

(21) Appl. No.: 15/356,966

(22) Filed: Nov. 21, 2016

(65) Prior Publication Data

US 2017/0223670 A1 Aug. 3, 2017

Related U.S. Application Data

(60) Provisional application No. 62/290,899, filed on Feb. 3, 2016.

(51) Int. Cl.
| | | |
|---|---|---|
| *H04W 72/04* | (2009.01) | |
| *H04L 5/00* | (2006.01) | |
| *H04W 88/02* | (2009.01) | |
| *H04W 72/00* | (2009.01) | |
| *H04W 24/08* | (2009.01) | |

(52) U.S. Cl.
CPC .......... *H04L 5/0048* (2013.01); *H04L 5/0053* (2013.01); *H04W 24/08* (2013.01); *H04W 72/00* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 9,794,922 B2 | 10/2017 | Xu et al. | |
| 2013/0003663 A1* | 1/2013 | Blankenship | ......... H04L 1/0004 370/329 |

(Continued)

FOREIGN PATENT DOCUMENTS

WO  WO-2016048570  3/2016

OTHER PUBLICATIONS

LG Electronics, "Discussion on Specification Impact for Latency Reduction Techniques," 3GPP TSG RAN WG1 Meeting #83, Ri-i156902, Anaheim, USA, Nov. 16-20, 2015, 6 pgs., XP051003256, 3rd Generation Partnership Project.*

(Continued)

*Primary Examiner* — Ayaz R Sheikh
*Assistant Examiner* — Sori A Aga
(74) *Attorney, Agent, or Firm* — Holland & Hart LLP

(57) ABSTRACT

Control information may be transmitted for different TTI lengths. Different control information for the different TTIs may be transmitted using control channel resources that are established for communication of control information, such as a physical downlink control channel (PDCCH), for example. Control information for a first TTI may be located in a first set of resources, and control information for a second TTI may be located in a second set of resources. The first set of resources may be located within a first search space that may be searched by a user equipment (UE) to identify the first control information. The second set of resources may be located within a second search space that may be searched by the UE to identify the second control information.

29 Claims, 19 Drawing Sheets

(56) References Cited

U.S. PATENT DOCUMENTS

| | | | | |
|---|---|---|---|---|
| 2013/0058294 | A1* | 3/2013 | Miki | H04L 5/0007 370/329 |
| 2016/0021657 | A1 | 1/2016 | Chen et al. | |
| 2016/0366604 | A1* | 12/2016 | Devarasetty | H04W 24/06 |
| 2017/0070982 | A1* | 3/2017 | Kawasaki | H04W 72/0406 |
| 2017/0264417 | A1* | 9/2017 | Eriksson | H04L 5/0096 |
| 2017/0290008 | A1* | 10/2017 | Tooher | H04W 72/0446 |

OTHER PUBLICATIONS

ETRI, "Discussion on TTI Shortening," 3GPP TSG RAN WG1 Meeting #83, R1-157110, Anaheim, USA, Nov. 16-20, 2015, 7 pgs., XP051040006, 3rd Generation Partnership Project.

ISA/EP, International Search Report and Written Opinion of the International Searching Authority, Int'l Application No. PCT/US2016/063232, dated Feb. 7, 2017, European Patent Office, Rijswijk, NL, 14 pgs.

LG Electronics, "Discussion on Specification Impact for Latency Reduction Techniques," 3GPP TSG RAN WG1 Meeting #83, R1-156902, Anaheim, USA, Nov. 16-20, 2015, 6 pgs., XP051003256, 3rd Generation Partnership Project.

Nokia Networks: "On Required Physical Layer Enhancements for TTI Shortening", 3GPP TSG-RAN WG1 Meeting #83, R1-157294, Anaheim, USA, Nov. 15-22, 2015, pp. 1-4.

Samsung: "Study on Specification Impact for Downlink due to TTI Shortening", 3GPP TSG RAN WG1 Meeing #83, R1-156819, Nov. 15, 2015, XP051003179, 5 pages, Retrieved from the Internet: URL:http://http://www.3gpp.org/ftp/Meetings_3GPP_SYNC/RAN1/Docs/ [retrieved on Nov. 15, 2015],.

* cited by examiner

CONTROL CHANNEL SIGNALING TECHNIQUES IN WIRELESS SYSTEMS WITH MULTIPLE POSSIBLE TRANSMISSION TIME INTERVALS

CROSS REFERENCES

The present Application for Patent claims priority to U.S. Provisional Patent Application No. 62/290,899 entitled "CONTROL CHANNEL SIGNALING TECHNIQUES IN WIRELESS SYSTEMS WITH MULTIPLE POSSIBLE TRANSMISSION TIME INTERVALS," filed Feb. 3, 2016, assigned to the assignee hereof.

BACKGROUND

The following relates generally to wireless communication, and more specifically to control channel signaling for systems configured to use multiple possible transmission time interval (TTI) lengths.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. A wireless multiple-access communications system, including a system operating according to the Long Term Evolution (LTE) standard, may include a number of base stations, each simultaneously supporting communication for multiple UEs. Uplink control information (UCI) and downlink control information (DCI) may be exchanged between a UE and a base station. UCI and DCI may include data such as acknowledgement data, channel state information (CSI), scheduling information (e.g., assignment information, modulation and coding scheme (MCS)), or the like. UCI may be transmitted from a UE to a base station using a Physical Uplink Control Channel (PUCCH) or a Physical Uplink Shared Channel (PUSCH), while DCI may be transmitted from a base station to a UE using a Physical Downlink Control Channel (PDCCH) or a Physical Downlink Shared Channel (PDSCH), for example.

In some applications, latency for various UEs may be reduced by selecting a TTI and adapting uplink and downlink resources allocated for transmitting control information (e.g., UCI, DCI) based on data traffic. Multiple different TTIs may in some cases result in different control information that is associated with each TTI, and efficient transmission of such control information may enhance the overall efficiency of systems that use multiple different TTIs.

SUMMARY

The described techniques relate to improved methods, systems, devices, or apparatuses that support control channel signaling in systems configurable to use multiple transmission time interval (TTI) lengths. The described techniques may provide for control information transmission for different TTI lengths, such as certain transmissions that use a 1 millisecond (ms) (or legacy) TTI along with a shorter TTI such as a 0.5 ms (or slot) TTI. Different control information for the different TTIs may be transmitted using control channel resources that are established for communication of control information, such as a physical downlink control channel (PDCCH), for example. Different resources within the control channel may be configured to provide control information for the different TTI transmissions. In some examples, control information for a 1 ms TTI may be located in a first set of resources, and control information for a 0.5 ms TTI may be located in a second set of resources.

In some examples, the first set of resources may be located within a first search space that may be searched by a user equipment (UE) to identify the 1 ms control information. The second set of resources may be located within a second search space that may be searched by the UE to identify the 0.5 ms control information. In some examples, the second search space may be determined based on the first search space, such as through being a subset of the first search space or otherwise derived based on the first search space. In some examples, blind decoding of the first or second search spaces to determine the control information may be based on a limited set of decoding candidates, DCI sizes, or based on a configured hybrid automatic repeat request (HARD) round trip time (RTT).

A method of wireless communication is described. The method may include identifying a first transmission time interval (TTI) with a first duration that includes two or more symbol periods and a second TTI with a second duration that is less than the first duration, identifying a first search space for monitoring for first control information associated with the first TTI, determining, based at least in part on the first search space, a second search space for monitoring for second control information associated with the second TTI, and monitoring at least one of the first search space for the first control information or the second for the second control information.

An apparatus for wireless communication is described. The apparatus may include means for identifying a first TTI with a first duration that includes two or more symbol periods and a second TTI with a second duration that is less than the first duration, means for identifying a first search space for monitoring for first control information associated with the first TTI, means for determining, based at least in part on the first search space, a second search space for monitoring for second control information associated with the second TTI, and means for monitoring at least one of the first search space for the first control information or the second for the second control information.

A further apparatus is described. The apparatus may include a processor, memory in electronic communication with the processor, and instructions stored in the memory. The instructions may be operable to cause the processor to identify a first TTI with a first duration that includes two or more symbol periods and a second TTI with a second duration that is less than the first duration, identify a first search space for monitoring for first control information associated with the first TTI, determine, based at least in part on the first search space, a second search space for monitoring for second control information associated with the second TTI, and monitor at least one of the first search space for the first control information or the second for the second control information.

A non-transitory computer readable medium for wireless communication is described. The non-transitory computer-readable medium may include instructions to cause a processor to identify a first TTI with a first duration that includes two or more symbol periods and a second TTI with a second duration that is less than the first duration, identify a first search space for monitoring for first control information associated with the first TTI, determine, based at least in part on the first search space, a second search space for monitoring for second control information associated with the second TTI, and monitor at least one of the first search space for the first control information or the second for the second control information.

In some examples of the method, apparatus, or non-transitory computer-readable medium described above, the second search space is correlated to the first search space. In some examples of the method, apparatus, or non-transitory computer-readable medium described above, the second search space is a subset of the first search space.

In some examples of the method, apparatus, or non-transitory computer-readable medium described above, the identifying the first search space comprises: deriving a set of decoding candidates for decoding of received wireless transmissions and identification (ID) of the first control information and the second control information. Some examples of the method, apparatus, or non-transitory computer-readable medium described above may further include processes, features, means, or instructions for identifying a first subset of the decoding candidates as being in the first search space.

In some examples of the method, apparatus, or non-transitory computer-readable medium described above, the determining the second search space comprises: identifying a second subset of the decoding candidates as being in the second search space. In some examples of the method, apparatus, or non-transitory computer-readable medium described above, the first subset of decoding candidates and the second subset of decoding candidates are non-overlapping subsets of the set of decoding candidates.

In some examples of the method, apparatus, or non-transitory computer-readable medium described above, the deriving is based on one or more of a UE network identifier, a random seed, or a total size available for control information. In some examples of the method, apparatus, or non-transitory computer-readable medium described above, the determining the second search space comprises: deriving the second search space based on one or more of a second UE network identifier or a second random seed.

In some examples of the method, apparatus, or non-transitory computer-readable medium described above, the first control information comprises first downlink control information (DCI) having a first DCI size and a first DCI format, and the second control information comprises second DCI having a second DCI size and a second DCI format, and where one or more of the first DCI size and the second DCI size or the first DCI format and the second DCI format is different.

In some examples of the method, apparatus, or non-transitory computer-readable medium described above, the first DCI size is larger than the second DCI size. In some examples of the method, apparatus, or non-transitory computer-readable medium described above, the first DCI size and second DCI size are the same, and where one or more bits of the second DCI provide different information than corresponding bits in the first DCI.

In some examples of the method, apparatus, or non-transitory computer-readable medium described above, the first DCI includes a first number of cyclic redundancy check (CRC) bits, and the second DCI includes a second number of CRC bits that is greater than the first number of CRC bits.

Some examples of the method, apparatus, or non-transitory computer-readable medium described above, the monitoring may include blind decoding wireless transmissions received in the first search space for the first control information. Some examples of the method, apparatus, or non-transitory computer-readable medium described above may further include processes, features, means, or instructions for blind decoding wireless transmissions received in the second search space for the second control information.

Some examples of the method, apparatus, or non-transitory computer-readable medium described above may further include processes, features, means, or instructions for identifying a set of blind decoding candidates for blind decoding transmissions received in the second search space based on one or more of an available number of aggregation levels for second TTI transmissions or an available DCI format for the second control information.

In some examples of the method, apparatus, or non-transitory computer-readable medium described above, a different set of blind decoding candidates for the first search space is identified when transmissions using the second TTI are configured than when transmissions using the second TTI are not configured.

Some examples of the method, apparatus, or non-transitory computer-readable medium described above may further include processes, features, means, or instructions for identifying a set of blind decoding candidates for blind decoding transmissions received in the second search space based on a round trip time (RTT) for hybrid automatic repeat request (HARD) feedback associated with the second control information.

Some examples of the method, apparatus, or non-transitory computer-readable medium described above may further include processes, features, means, or instructions for identifying a first RTT for HARQ feedback associated with the first control information. Some examples of the method, apparatus, or non-transitory computer-readable medium described above may further include processes, features, means, or instructions for identifying a second RTT for HARQ feedback associated with the second control information, where the second RTT is shorter than the first RTT.

In some examples of the method, apparatus, or non-transitory computer-readable medium described above, the second RTT is determined based on a capability of a UE receiving the second control information. In some examples of the method, apparatus, or non-transitory computer-readable medium described above, the first RTT is determined to be a legacy RTT or a shorter RTT than the legacy RTT based on a capability of the UE.

In some examples of the method, apparatus, or non-transitory computer-readable medium described above, the second control information comprises a first subset of second control information transmitted in a first slot of a wireless transmission subframe and a second subset of second control information transmitted in a second slot of the wireless transmission subframe.

In some examples of the method, apparatus, or non-transitory computer-readable medium described above, the first subset transmitted in the first slot of the wireless transmission subframe is transmitted in a control channel that is time division multiplexed with shared channel data transmissions in the first slot, and wherein second subset transmitted in the second slot of the wireless transmission subframe is transmitted in a second control channel that is both time division multiplexed and frequency division multiplexed with shared channel data transmissions in the second slot.

Some examples of the method, apparatus, or non-transitory computer-readable medium described above may further include processes, features, means, or instructions for determining a starting symbol for the shared channel data transmissions in the second slot based on one or more of a configured starting symbol location or a symbol location of the second subset of second control information.

Some examples of the method, apparatus, or non-transitory computer-readable medium described above may further include processes, features, means, or instructions for determining a third search space in the second slot for monitoring for the second subset of second control information. Some examples of the method, apparatus, or non-transitory computer-readable medium described above may further include processes, features, means, or instructions for determining a starting symbol for the shared channel data transmissions in the second slot based on the third search space.

In some examples of the method, apparatus, or non-transitory computer-readable medium described above, the third search space is determined based on a set of resource blocks (RBs) of the second slot configured for control information transmissions. In some examples of the method, apparatus, or non-transitory computer-readable medium described above, the first search space and second search space are distributed over a system bandwidth for transmissions in the first slot, and where the third search space is distributed over a subset of the system bandwidth.

In some examples of the method, apparatus, or non-transitory computer-readable medium described above, the third search space is determined based on a transmission mode associated with the second control information.

In some examples of the method, apparatus, or non-transitory computer-readable medium described above, the second subset of second control information comprises one or more of physical downlink control channel (PDCCH) information or physical control format indicator channel (PCFICH) information transmitted in a second slot of the wireless transmission subframe.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
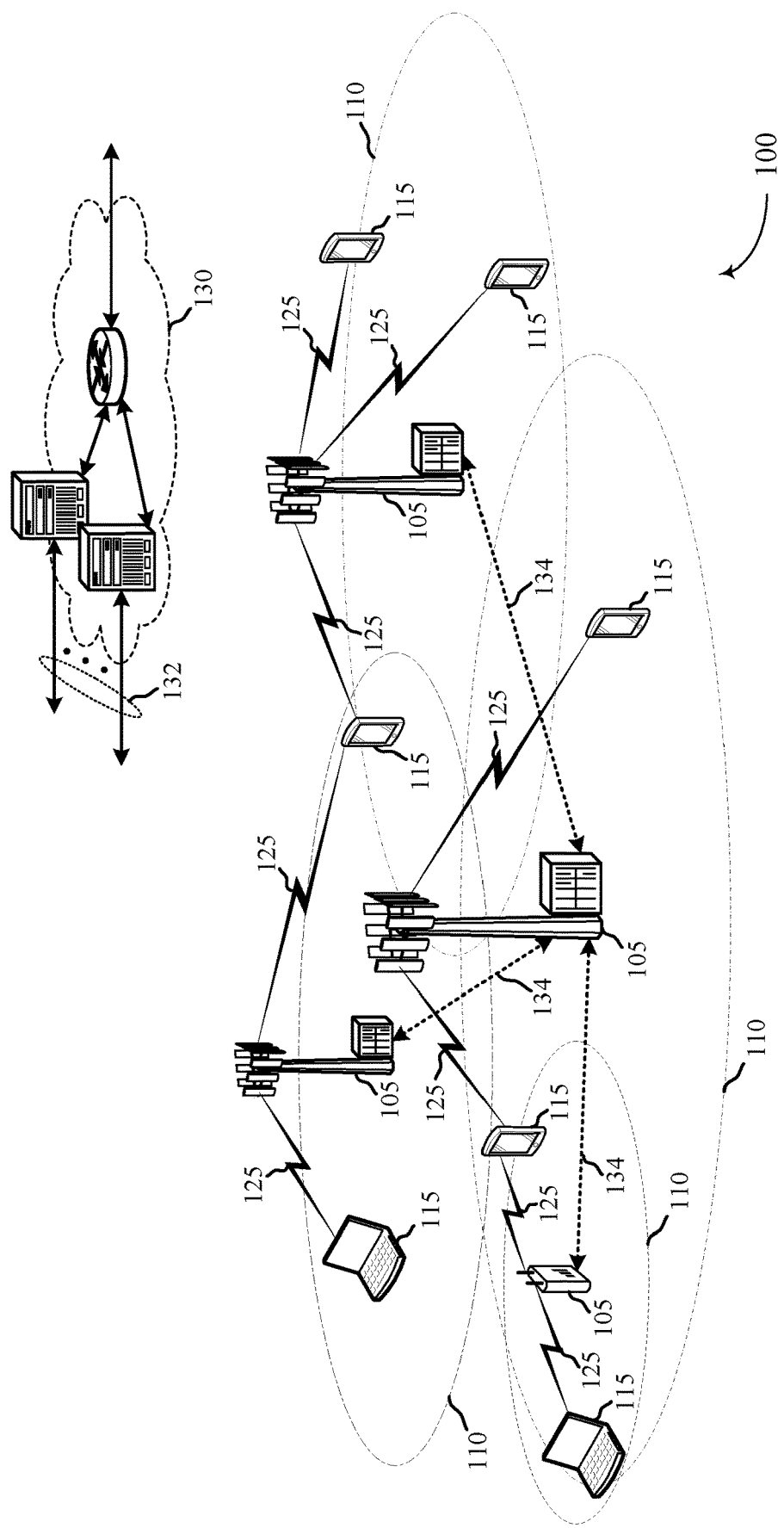
FIG. 1 illustrates an example of a wireless communications system that supports control channel signaling with multiple TTI lengths in accordance with aspects of the present disclosure.

Certain wireless communication applications may be bursty in nature. A particular user equipment (UE) may, for example, operate a relatively long period without sending or receiving data, and then a relatively large amount, or burst, of data may queue up for transmission to the UE. The data may be associated with a latency sensitive application, such as a vehicle communication system, a gaming application, or other implementation that is delay intolerant. A base station may, in some examples, configure multiple different transmission time intervals (TTIs) for communications with a UE. In some examples, a wireless subframe may be a 1 ms subframe and contain two slots that are each 0.5 ms. Some examples provide for control information transmission for 1 ms (of legacy) TTI lengths along with different control information for the 0.5 ms (or slot) TTIs. The control information may be transmitted using control channel resources that are established for communication of control information, such as a physical downlink control channel (PDCCH) or enhanced PDCCH (ePDCCH), for example. Different resources within the control channel may be configured to provide control information for the different TTI transmissions.

In some examples, control information for a 1 ms TTI may be located in a first set of resources, and control information for a 0.5 ms TTI may be located in a second set of resources. In some examples, the first set of resources may be located within a first search space that may be searched by a user equipment (UE) to identify the 1 ms control information. The second set of resources may be located within a second search space that may be searched by the UE to identify the 0.5 ms control information. In some examples, the second search space may be determined based on the first search space, such as through being a subset of the first search space or otherwise derived based on the first search space. In some examples, blind decoding of the first or second search spaces to determine the control information may be based on a limited set of decoding candidates, DCI sizes, or based on a configured hybrid automatic repeat request (HARQ) round trip time (RTT).

As described herein, available resources and parameters for communication of control information using low latency TTIs may be determined with respect to resources of other, longer duration TTIs. A system may configure low latency TTIs to support concurrent operation with longer duration TTIs. For instance, resource availability for low latency data transmissions may be symbol dependent. Whether a symbol of longer duration TTI includes a secondary synchronization signal (SSS) or physical broadcast channel (PBCH) information may affect resource availability for a low latency TTI control information, and resources with PBCH information or a SSS may be omitted from the search space.

Aspects of the disclosure introduced above are described below in the context of a wireless communication system. A wireless communication system may include a base station and a UE which are both configurable to communication using one or more of multiple TTI durations as described herein. Aspects of the disclosure are further illustrated by and described with reference to apparatus diagrams, system diagrams, and flowcharts that relate to control channel signaling with multiple TTI lengths.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. The wireless communications system 100 may support low latency applications and communications with multiple TTI lengths as described herein. Additionally, the wireless communications system 100 may multiple HARQ RTTs for low latency applications and multiple TTI length operations.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Data communications within wireless communications system 100 may be divided into and described with reference to logical channels, transport channels, and physical (PHY) layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, dedicated traffic channel (DTCH) for dedicated UE data, and multicast traffic channel (MTCH), for multicast data.

DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and uplink shared channel (UL-SCH) for data.

DL PHY channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL PHY channels may include physical random access channel (PRACH) for access messages, physical uplink control channel (PUCCH) for control data, and physical uplink shared channel (PUSCH) for user data.

PDCCH carries downlink control information (DCI) which, in legacy operations in included in at least one control channel element CCE, which may consist of nine logically contiguous resource element groups (REGs), where each REG contains 4 REs. In some examples of the current disclosure, the format of the DCI may be different for 1 ms TTIs than for slot TTIs, as will be discussed herein. DCI includes information regarding DL scheduling assignments, UL resource grants, transmission scheme, UL power control, hybrid automatic repeat request (HARQ) information, MCS and other information. The size and format of the DCI messages can differ depending on the type and amount of information that is carried by the DCI.

PDCCH can carry DCI messages associated with multiple users, and each UE 115 may decode the DCI messages that are intended for it. For example, each UE 115 may be assigned a cell-radio network temporary identifier (C-RNTI) and cyclic redundancy check (CRC) bits attached to each DCI may be scrambled based on the C-RNTI. To reduce power consumption and overhead at the UE, a limited set of CCE locations can be specified for DCI associated with a specific UE 115, which is referred to as a search space. CCEs may be grouped (e.g., in groups of 1, 2, 4 and 8 CCEs), and a search space that may include a set of CCE locations in which the UE may find relevant DCI may be specified. A UE 115 may attempt to decode DCI by performing a process known as a blind decode, using decoding candidates associated with different formats of the DCI. In some cases, a control portion of a slot TTI may include a quick PDCCH (QPDCCH), which may information related to slot TTI communications.

Time intervals for communication within wireless communications system 100 may be expressed in multiples of a basic time unit (e.g., the sampling period, $Ts=1/30,720,000$ seconds). Time resources may be organized according to radio frames of length of 10 ms (Tf=307200 Ts), which may be identified by a system frame number (SFN) ranging from 0 to 1023. Each frame may include ten 1 ms subframes numbered from 0 to 9. A subframe may be further divided into two 0.5 ms slots, each of which contains two or more modulation symbol periods (depending on the length of the cyclic prefix (CP) prepended to each symbol). Excluding the CP, each symbol contains 2048 sample periods. In various examples, legacy or 1 ms TTI communications may use a subframe as the smallest scheduling unit or TTI. Furthermore, as indicated above, wireless communications system 100 may support TTIs having a duration of one subframe as well as shorter duration, such as 0.5 ms or slot TTI (or shorter TTIs), which may have a duration of less than one LTE subframe (e.g., one slot). In various examples, wireless communications system 100 supports two or more TTI durations—including a first duration that is at least two LTE symbol periods in duration, and a second duration that is less than the first duration.

Wireless communications system 100 may employ HARQ, a method of increasing the likelihood that data is received correctly over a wireless communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response, and retransmission may be referred to as a HARQ process, and the total time between a transmission and starting of retransmission of unsuccessfully received data may be referred to as a round trip time (RTT). In some cases, a limited number of HARQ processes may be used for a given communication link 125.

In some examples, HARQ processes may be performed at a transport block level, in which the entire transport block is retransmitted when a NACK is received by the transmitter. In a multi-TTI assignment, separate indicators for new data may be used for each transport block (TB) in the assignment. Or, in some examples, a single new data indicator may be used for all TBs of the assignment. In other cases, multi-TTI scheduling may be used for new transmissions only, such that retransmission may, in some examples, be limited to individual assignments.

In some examples, a transport block may be divided into one or more code blocks and HARQ processes may be performed at a code block level where one or more code blocks (e.g., the one or more code blocks that were unsuccessfully decoded by the receiver) are retransmitted when a NACK is received by the transmitter. The threshold for code block level HARQ processes for low latency TTIs may be different from longer duration TTIs (e.g., it might be different that 6144 bits, as is in LTE).

Some examples may employ different HARQ RTTs for legacy TTIs and for slot TTIs. For example, a HARQ RTT for legacy TTIs may be 8 ms, and a HARQ RTT for slot TTIs may be 4 ms. In other examples, if both 1ms and slot TTIs are used, the 1 ms HARQ RTT may be 4 ms and the slot TTI HARQ RTT may be 2 ms, 3 ms, or 4 ms, depending upon UE capability.

In some cases, wireless communications system 100 may utilize one or more enhanced component carrier (eCCs). An eCC may be characterized by one or more features including: flexible bandwidth, different TTI durations, and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

So wireless communications system 100 may concurrently support multiple latency modes. Available resources and parameters for control information communication according to one latency mode of wireless communications system 100 may be determined with respect to resources used for another latency mode of wireless communications system 100. For example, a UE 115 may use a search space for 1 ms TTI control information to determine a different search space for slot TTI control information. For example, the search space for slot TTI control information may be a subset of the search space for 1 ms TTI control information, a search space may be determined based on 1 ms TTI techniques and divided up between 1 ms TTI and slot TTI search spaces, or a slot TTI search space may be correlated to the 1 ms TTI search space such as through an offset from the 1 ms search space, through a separate RNTI, through different random seeds, or any combination thereof. A UE 115 may determine a search space for 1 ms TTI control information and slot TTI control information, and perform blind decoding over the search spaces to identify control information. Scheduling of 1 ms or slot TTIs may be UE-specific and may be dynamically or semi-statically indicated.

Figure 2:
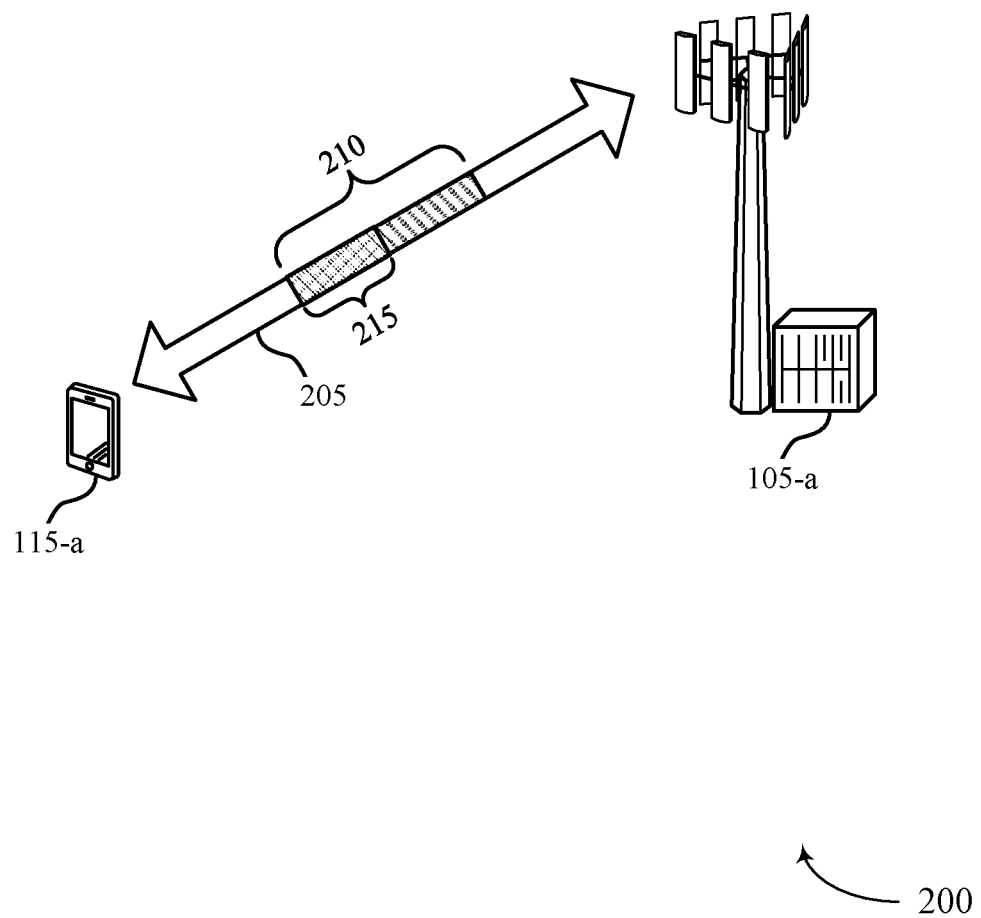
FIG. 2 illustrates an example of a wireless communications system that supports control channel signaling with multiple TTI lengths in accordance with aspects of the present disclosure.

FIG. 2 illustrates an example of a wireless communications system 200 that supports control channel signaling with multiple TTI lengths. Wireless communications system 200 may include base station 105-a and UE 115-a, which may be examples of the corresponding devices described with reference to FIG. 1. Wireless communications system 200 may illustrate aspects of wireless communications system 100. For instance, wireless communications system 200 may include UE 115-a and a base station 105-a, which may be an examples of a UE 115 or base station 105 described with reference to FIG. 1. Base station 105-a may communicate with UE 115-a via communication link 205 and transmit control information to UE 115-a for multiple duration TTIs, as described with reference to FIG. 1.

A frame structure may be used within the wireless communications system 200 to organize physical resources. A frame may be a 10 ms interval that may be further divided into 10 equally sized subframes or TTIs. Each subframe may include two consecutive time slots. Each slot may include 6 or 7 OFDMA symbol periods. A resource element consists of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in 1 slot (84 resource elements) in the time domain. Further details of TTIs that may be utilized by wireless communications system 200 are illustrated by and described with reference to FIGS. 3-4.

In some cases, 1 ms length TTI 210 may be an LTE subframe, as well as a short TTI 215. Short TTI 215 may have a length (i.e., duration) shorter than fixed length TTI 210, such as 0.5 ms or a slot duration. Short TTIs 215 may be employed for low latency operations, in some deployments. In some cases, using shorter length TTIs may reduce over-the-air latency. For example, short TTIs 215 may help reduce HARQ latency as compared with non-low latency TTIs such as 1 ms length TTI 210.

In some examples, slot level short TTIs 215 may follow LTE/LTE-A numerology, may be backward compatible, and may co-exist with 1-ms LTE traffic in which transmitted subframes may include both 1 ms TTI transmissions as well as slot TTI transmissions. In some examples, slot level TTI may re-use existing broadcast, random access, and handover procedures, as well as other procedures of LTE/LTE-A. In some examples, control information for both 1 ms TTI transmissions and slot TTI transmissions may use PDCCH or slot-based ePDCCH (which may be referred to as Quick PDCCH (QPDCCH) or Quick ePDCCH (QePDCCH). In some examples, PHICH in the legacy control region may be used for both slot 0 and slot 1 uplink data transmissions. Adjustments to resource allocation, transport block size (TBS) determination, and the link may be implemented in slot TTI transmissions, in some deployments.

As indicated above, control information for slot-level TTIs may be provided using PDCCH-based signaling. Various examples described herein provide for one or more modifications to PDCCH/ePDCCH-based signaling to provide control information for slot-level TTIs. In some examples, control transmissions may reuse the legacy control region in slot 0 of a subframe (e.g., PDCCH transmissions in symbol 0 of slot 0). Slot-based TTI shared channel transmissions (e.g., Quick PDSCH or QPDSCH transmissions) in slot 0 may be scheduled by QPDCCH. In some examples, QPDCCH transmissions re-use PDCCH CCE structure and may be fully multiplexed with other legacy control channels. Some examples may provide a new DCI to indicate slot 0 and differentiate slot versus subframe TTI scheduling assignments. In other examples, PDCCH transmissions may include a grant for both subframe TTI assignments and slot TTI assignments for both slots in a subframe. Such techniques may allow multiplexing of QPDCCH with PDCCH as well as frequency division multiplexing (FDM) of QPDSCH with PDSCH/ePDCCH.

Figure 3:
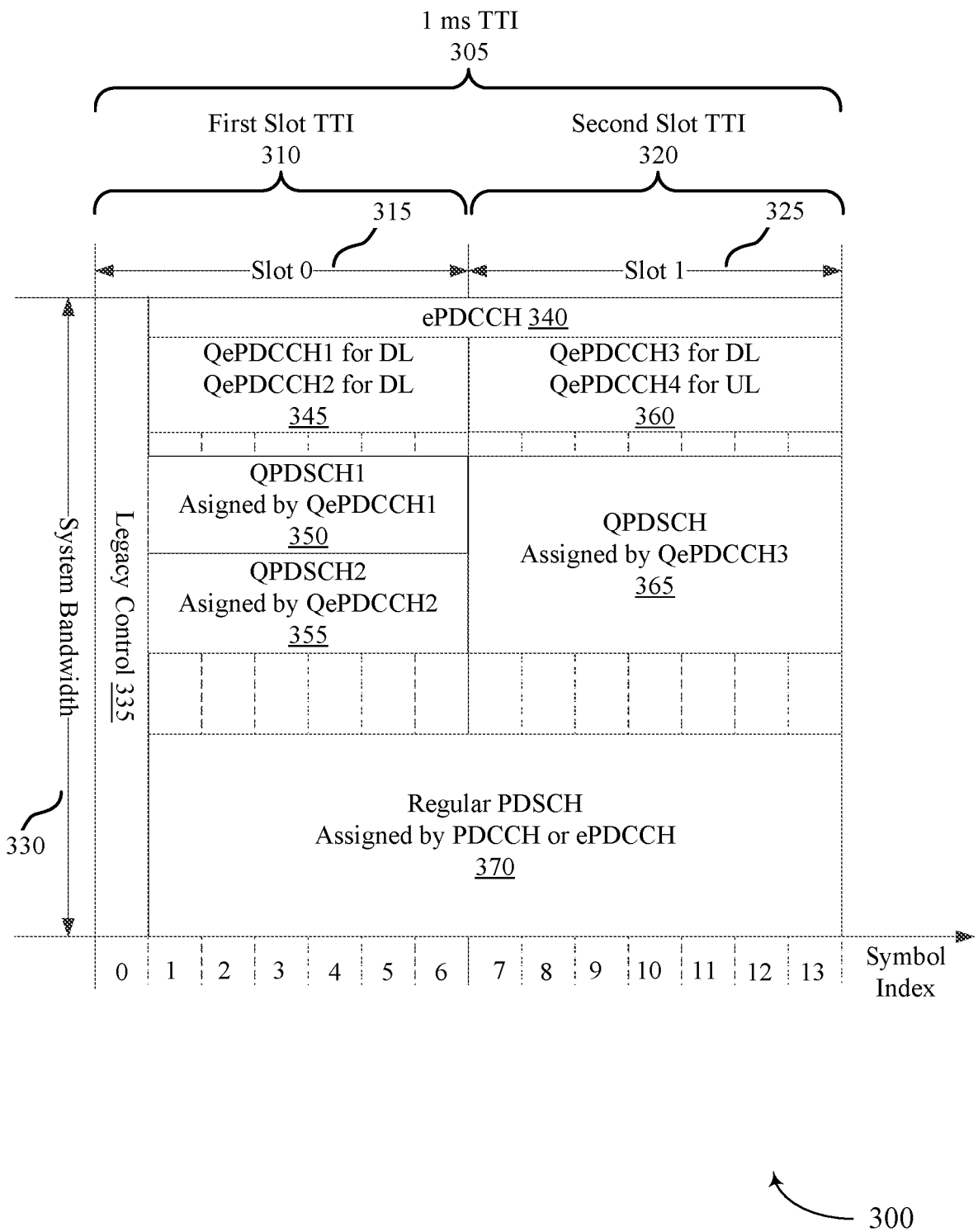
FIG. 3 illustrates an example of a wireless subframe that supports control channel signaling with multiple TTI lengths in accordance with aspects of the present disclosure.

FIG. 3 illustrates an example of a subframe 300 for control channel signaling with multiple TTI lengths. In some cases, subframe 300 may include 1 ms TTI transmissions and slot TTI transmissions according to aspects of techniques performed by a UE 115 or base station 105 as described with reference to FIGS. 1-2. In the example of FIG. 3, subframe 300 may have a 1 ms duration 305 that corresponds to a 1 ms TTI duration 305. The subframe 300 include slot 0 315, and slot 1 325, which may correspond, respectively, to a first slot TTI 310 and a second slot TTI 320. The subframe 300 may be transmitted using a system bandwidth 330 and may have 14 symbols, representing a normal CP. A legacy control region 335 may occupy a first symbol and an ePDCCH 340 may occupy resources that span both slot 0 315 and slot 1 325, and may include control information for shared channel transmissions, or regular PDSCH 370 assigned by PDCCH or ePDCCH. The first slot TTI 310 may include control information for two downlink shared channel assignments through QePDCCH1 and QePDCCH2 resources 345. In this example, QePDCCH1 may contain control information for QPDSCH1 350, and QePDCCH2 may contain control information for QPDSCH2 355. In the example of FIG. 3, the second slot TTI 320 may include control information for a third downlink shared channel assignment and an uplink assignment, through QePDCCH3 (for DL) and QePDCCH4 (for UL) resources 360. In this example, QePDCCH3 may contain control information for QPDSCH 365 of slot 1 325, and QePDCCH4 may contain control information for an associated uplink transmission. Thus, in this example, FDM with QePDCCH and QPDSCH is provided.

Figure 4:
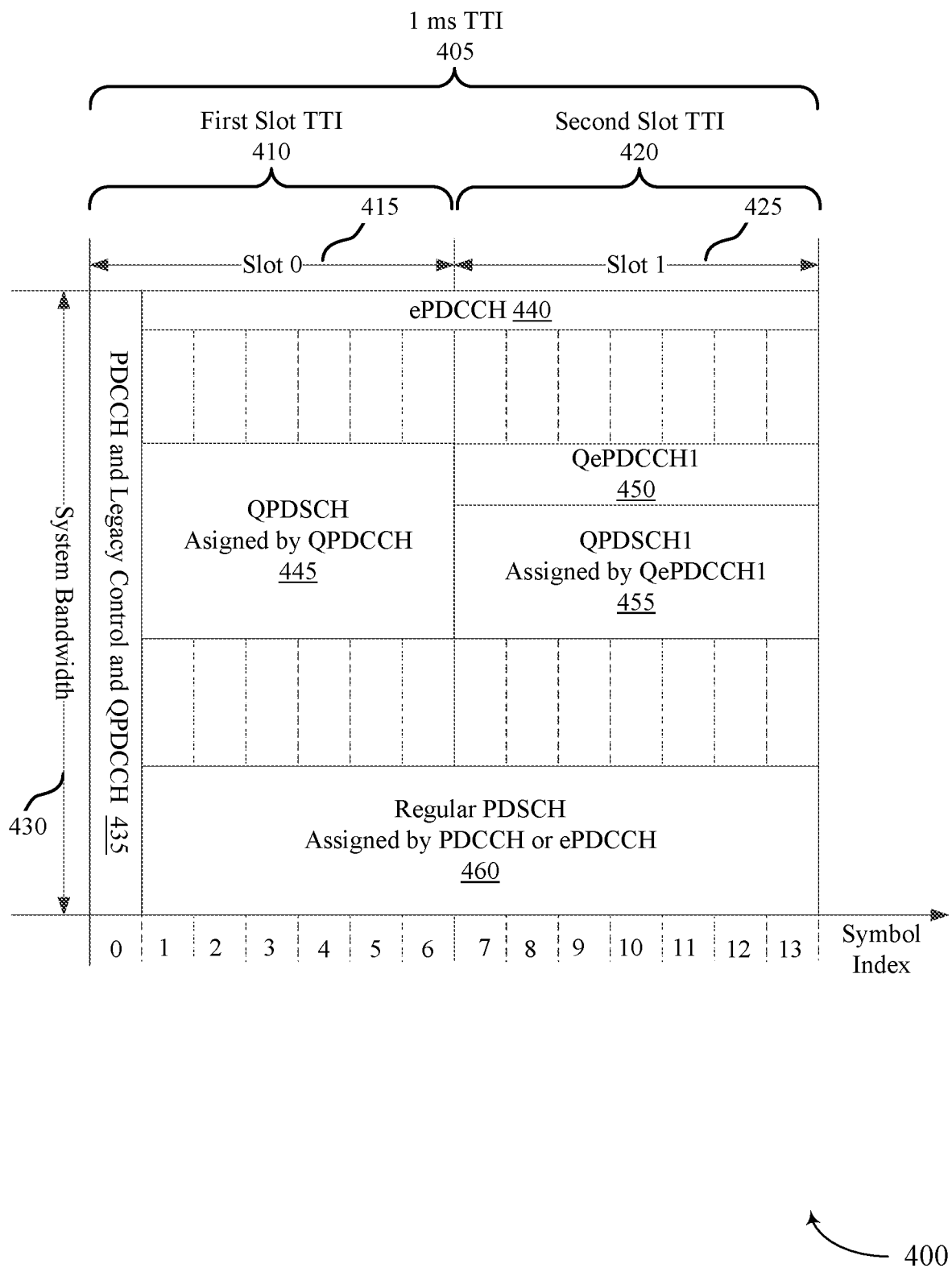
FIG. 4 illustrates another example of a wireless subframe that supports control channel signaling with multiple TTI lengths in accordance with aspects of the present disclosure.

In other examples, FDM may be used for PDCCH, QPDCCH, and QPDSCH transmissions. FIG. 4 illustrates such an example, with a subframe 400 for control channel signaling with multiple TTI lengths. In some cases, subframe 400 may include 1 ms TTI transmissions and slot TTI transmissions according to aspects of techniques performed by a UE 115 or base station 105 as described with reference to FIGS. 1-2. In the example of FIG. 4, subframe 400 may have a 1 ms duration 405 that corresponds to a 1 ms TTI duration 405. The subframe 400 include slot 0 415, and slot 1 425, which may correspond, respectively, to a first slot TTI 410 and a second slot TTI 420. The subframe 400 may be transmitted using a system bandwidth 430 and may have 14 symbols, representing a normal CP.

In this example, symbol 0 of slot 0 415 may include PDCCH, legacy control, and QPDCCH resources 435, which may be allocated resources using FDM. An ePDCCH 440 may occupy resources that span both slot 0 415 and slot 1 425, and may include control information for shared channel transmissions, or regular PDSCH 460 assigned by PDCCH or ePDCCH. The first slot TTI 410 may include QPDSCH resources 445 that may be assigned in the QPDCCH. In the example of FIG. 4, the second slot TTI 420 may include control information in QePDCCH1 resources 450. In this example, QePDCCH1 450 may contain control information for QPDSCH1 455 of slot 1 425. Thus, in this example, FDM with PDCCH, QPDCCH, QePDCCH and QPDSCH resources is provided.

Figure 5:
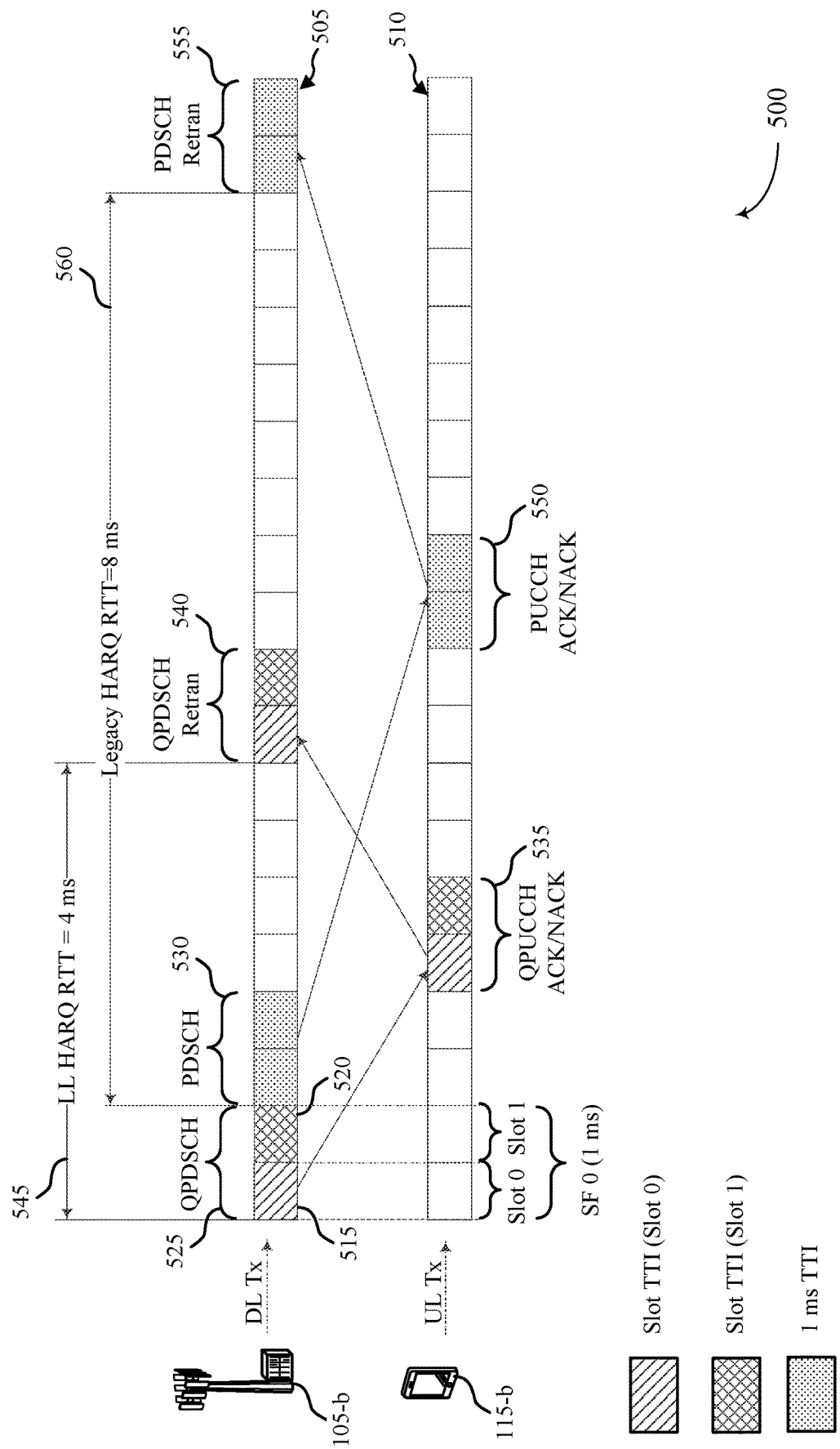
FIG. 5 illustrates an example of uplink and downlink communications that support control channel signaling with multiple TTI lengths in accordance with aspects of the present disclosure.

FIG. 5 illustrates an example of UL and DL transmissions 500 that support multiple TTIs and associated control channel signaling. In some cases, UL and DL transmissions 500 may represent aspects of techniques performed by a UE 115 or base station 105 as described with reference to FIGS. 1-2.

FIG. 5 also illustrates HARQ timing and RTT associated with 1 ms TTIs and slot TTIs according to some examples. In legacy LTE, HARQ feedback for a transmission may be provided in a first available TTI that is n+4 TTIs away from a TTI (TTI n) that includes the transmission associated with the HARQ feedback. Thus, legacy LTE, and in some examples 1 ms TTI transmissions, may have a HARQ RTT of 8 ms. In some examples, slot TTI transmissions may follow the same relationship for transmission of HARQ feedback and subsequent retransmissions, and thus provide linear scaling and a HARQ RTT of 4 ms.

In the example, of FIG. 5, base station 105-*b* may transmit DL transmissions 505, and UE 115-*b* may transmit UL transmissions 510. The DL transmissions 505 and UL transmissions 510 may include both 1 ms TTI transmissions as well as slot TTI transmissions. In this example, subframe 0 may include sot 0 and slot 1, which may include QPDSCH DL transmissions 525 that may include a first slot transmission 515 in slot 0 and a second slot transmission 520 in slot 1. The DL transmissions 505 may include PDSCH transmission 530 that may use a 1 ms TTI. As indicated above, UE 115-*b* may receive QPDSCH transmissions 525 and provide HARQ feedback. In this example, QPUCCH ACK/NACK transmissions 535 may be transmitted by UE 115-*b* four slots after the associated QPDSCH transmission 525. The base station 105-*b* may receive the QPUCCH ACK/NACK transmissions 535 and transmit, if needed, QPDSCH retransmission 540 of data having a NACK feedback. Because the slot TTI length is one-half the 1 ms TTI length, the low latency (LL) HARQ RTT 545 of this example is 4 ms, one-half of the 1 ms RTT. Likewise, 1 ms TTI PDSCH transmission 530 may be received at UE 115-*b* which may provide PUCCH ACK/NACK feedback 550 according to legacy LTE HARQ timelines. The base station 105-*b* may receive the PUCCH ACK/NACK transmissions 550 and transmit, if needed, PDSCH retransmission 555 of data having a NACK feedback, according to legacy timelines thus providing a HARQ RTT 560 of 8 ms. Thus, slot TTI transmissions may have a reduced HARQ RTT, and may thus provide lower latency for HARQ feedback and associated retransmissions.

Figure 6:
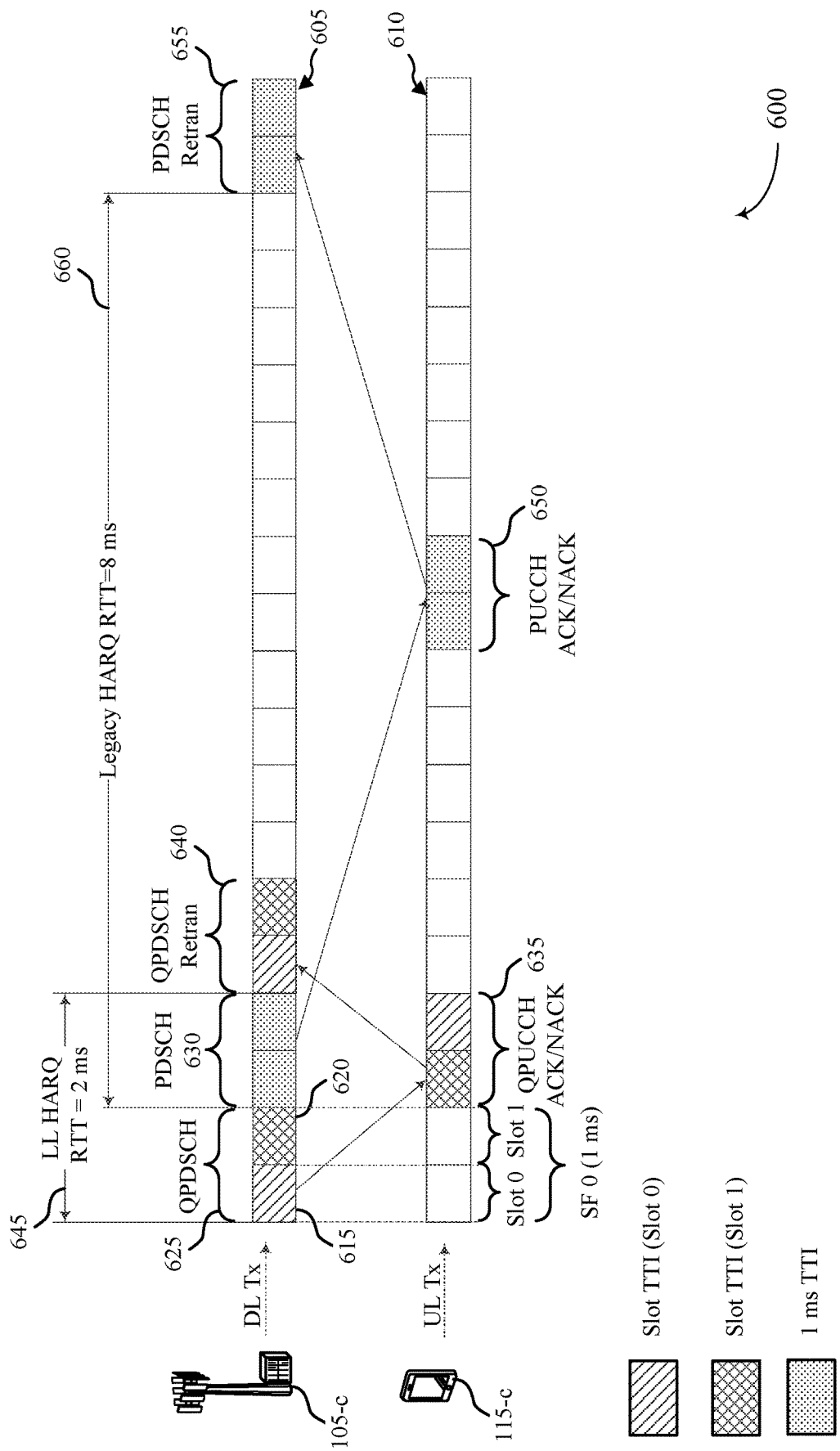
FIG. 6 illustrates another example of uplink and downlink communications that support control channel signaling with multiple TTI lengths in accordance with aspects of the present disclosure.

In some examples, instead of a factor of 2 (8 ms vs. 4 ms) reduction in HARQ RTT, additional reduction of HARQ RTT may be configured. FIG. 6 illustrates such an example, showing UL and DL transmissions 600 that support multiple TTIs and associated control channel signaling. In some cases, UL and DL transmissions 600 may represent aspects of techniques performed by a UE 115 or base station 105 as described with reference to FIGS. 1-2. FIG. 6 also illustrates HARQ timing and RTT associated with 1 ms TTIs, with further reduced slot TTI HARQ RTT. In this example, slot TTI transmissions may provide for transmission of HARQ feedback with only one TTI separating a DL transmission and an ACK/NACK feedback indication, and with one TTI separating receipt of ACK/NACK feedback and a retransmission. Thus, in such examples, slot TTI transmission may be provided with a HARQ RTT of 2 ms.

In the example, of FIG. 6, base station 105-*c* may transmit DL transmissions 605, and UE 115-*c* may transmit UL transmissions 610. The DL transmissions 605 and UL transmissions 610 may include both 1 ms TTI transmissions as well as slot TTI transmissions. In this example, subframe 0 may include sot 0 and slot 1, which may include QPDSCH DL transmissions 625 that may include a first slot transmission 615 in slot 0 and a second slot transmission 620 in slot 1. The DL transmissions 605 may include PDSCH transmission 630 that may use a 1 ms TTI. As indicated above, UE 115-*c* may receive QPDSCH transmissions 625 and provide HARQ feedback. In this example, QPUCCH ACK/NACK transmissions 635 may be transmitted by UE 115-*c* with a one TTI, or one slot gap, after the associated QPDSCH transmission 625. The base station 105-*c* may receive the QPUCCH ACK/NACK transmissions 635 and transmit, if needed, QPDSCH retransmission 640 of data having a NACK feedback. Because the slot TTI length is 0.5 ms, the LL HARQ RTT 645 of this example is 2 ms. Similarly as discussed with respect to FIG. 5, 1 ms TTI PDSCH transmission 630 may be received at UE 115-*c* which may provide PUCCH ACK/NACK feedback 650 according to legacy LTE HARQ timelines. The base station 105-*c* may receive the PUCCH ACK/NACK feedback 650 and transmit, if needed, PDSCH retransmission 655 of data having a NACK feedback, according to legacy timelines thus providing a HARQ RTT 660 of 8 ms. Such a HARQ timeline may provide more challenging requirements for processing at the UE 115-*c* and base station 105-*c*, and in some examples a UE may be configured for a shorter HARQ RTT based on capabilities of the UE. Such a HARQ timeline for slot TTI may also result in more limitation on possible UL timing advance (which effectively reduces the processing time) and hence the coverage area for such examples may be reduced relative to coverage areas available for longer HARQ timelines.

Figure 7:
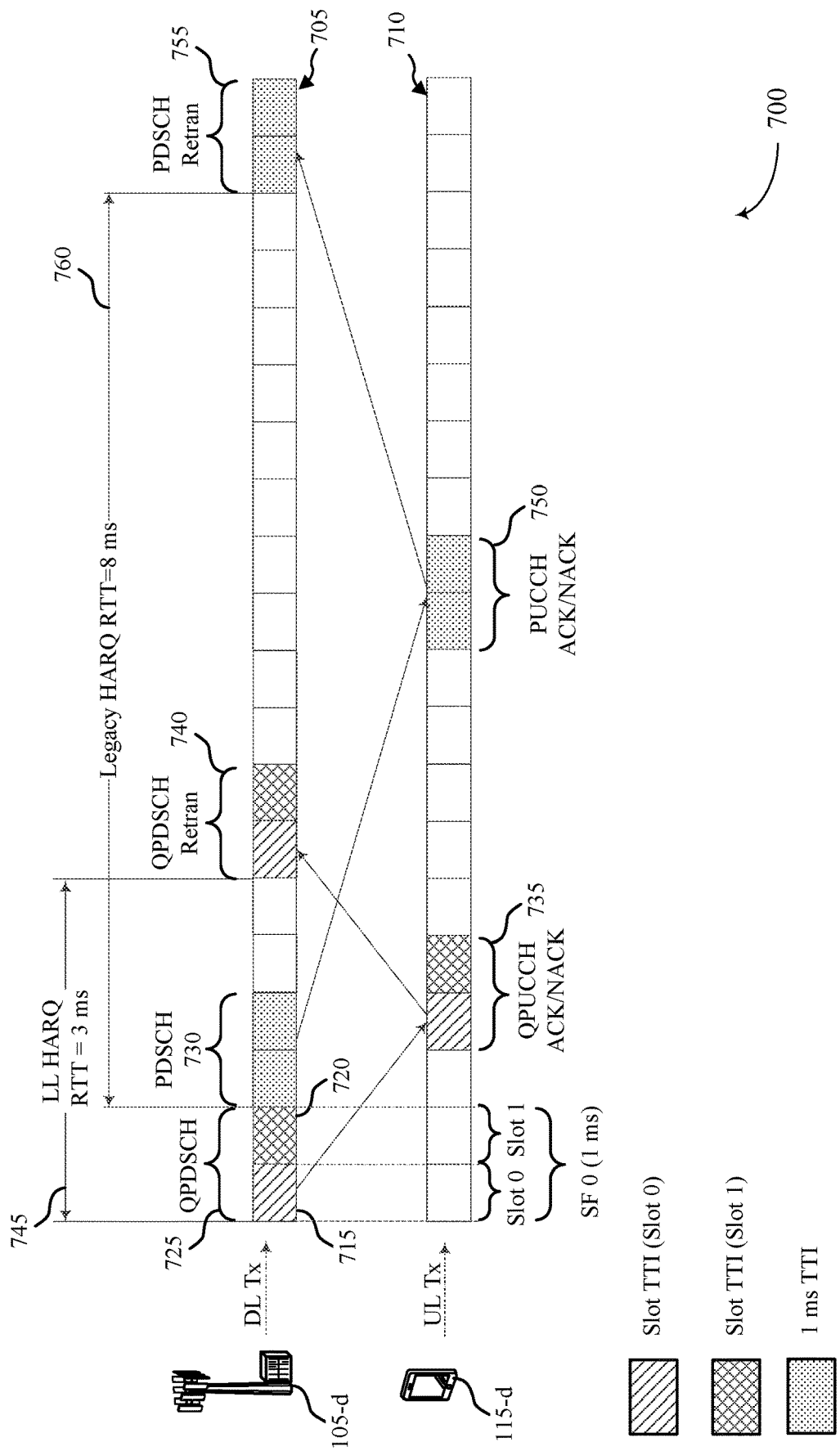
FIG. 7 illustrates another example of uplink and downlink communications that support control channel signaling with multiple TTI lengths in accordance with aspects of the present disclosure.

As indicated above, a 2 ms HARQ timeline may provide processing challenges to some UEs, and also may result in a reduced coverage area. In some examples, a slot TTI HARQ timeline may be selected based on particular UE capabilities, coverage area requirements, particular traffic at a given time, other factors, or any combination thereof. For example, a 3 ms HARQ RTT may be configured for slot TTI communications. FIG. 7 illustrates an example of such UL and DL transmissions 700. In some cases, UL and DL transmissions 700 may represent aspects of techniques performed by a UE 115 or base station 105 as described with reference to FIGS. 1-2. FIG. 7 also illustrates HARQ timing and RTT associated with 1 ms TTIs, with further reduced slot TTI HARQ RTT. In this example, slot TTI transmissions may provide a HARQ timeline of 3 ms.

In the example, of FIG. 7, base station 105-*d* may transmit DL transmissions 705, and UE 115-*d* may transmit UL transmissions 710. The DL transmissions 705 and UL transmissions 710 may include both 1 ms TTI transmissions as well as slot TTI transmissions. In this example, subframe 0 may include sot 0 and slot 1, which may include QPDSCH DL transmissions 725 that may include a first slot transmission 715 in slot 0 and a second slot transmission 720 in slot 1. The DL transmissions 705 may include PDSCH transmission 730 that may use a 1 ms TTI. As indicated above, UE 115-*d* may receive QPDSCH transmissions 725 and provide HARQ feedback. In this example, QPUCCH ACK/NACK transmissions 735 may be transmitted by UE 115-*d* with a two TTI, or two slot gap, after the associated QPDSCH transmission 725. The base station 105-*d* may receive the QPUCCH ACK/NACK transmissions 735 and transmit, if needed, QPDSCH retransmission 740 of data having a NACK feedback. Because the slot TTI length is 0.5 ms, the LL HARQ RTT 745 of this example is 3 ms. Similarly as discussed with respect to FIG. 5, 1 ms TTI PDSCH transmission 730 may be received at UE 115-*d* which may provide PUCCH ACK/NACK feedback 750 according to legacy LTE HARQ timelines. The base station 105-*d* may receive the PUCCH ACK/NACK feedback 750 and transmit, if needed, PDSCH retransmission 755 of data having a NACK feedback, according to legacy timelines thus providing a HARQ RTT 760 of 8 ms. Such a HARQ timeline may provide more relaxed requirements for processing at the UE 115-*d* and base station 105-*d* relative to the 2 ms RTT of the example of FIG. 6, and in some examples a UE may be configured for such a HARQ RTT based on capabilities of the UE.

Figure 8:
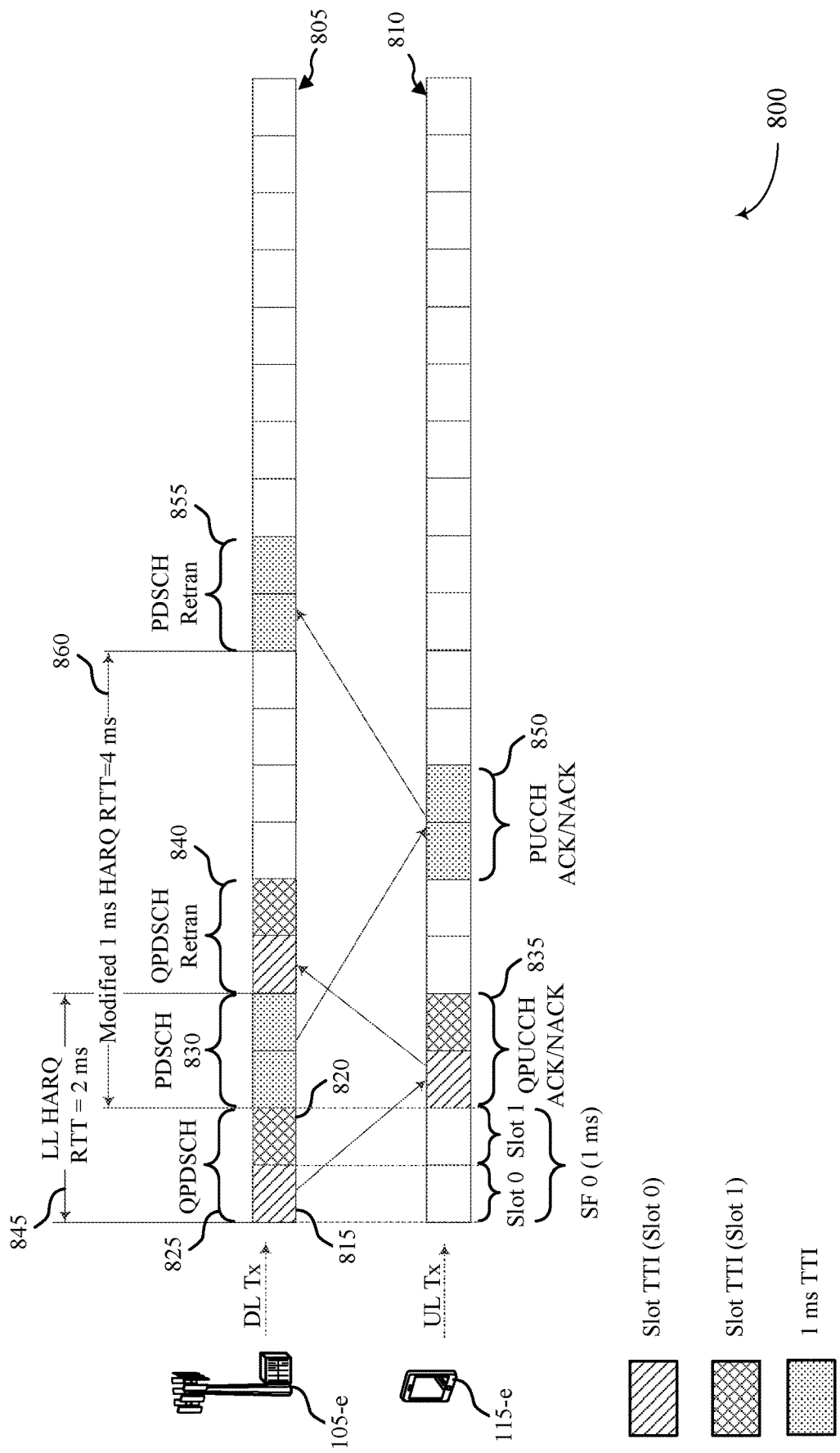
FIG. 8 illustrates another example of uplink and downlink communications that support control channel signaling with multiple TTI lengths in accordance with aspects of the present disclosure.

In further examples, HARQ RTT for 1 ms TTI transmissions may also be modified. For example, slot TTI transmissions may be configured with a reduced HARQ RTT, and 1 ms TTI transmissions also may be configured with a reduced HARQ RTT. FIG. 8 illustrates such an example of UL and DL transmissions 800 that support multiple TTIs and associated control channel signaling. In some cases, UL and DL transmissions 800 may represent aspects of techniques performed by a UE 115 or base station 105 as described with reference to FIGS. 1-2. FIG. 8 also illustrates reduced HARQ timing and RTT associated with 1 ms TTIs, with further reduced slot TTI HARQ RTT. In this example, both slot TTI and 1 ms TTI transmissions may provide for transmission of HARQ feedback with only one TTI separating a DL transmission and an ACK/NACK feedback indication, and with one TTI separating receipt of ACK/NACK feedback and a retransmission. Thus, in such examples, slot TTI transmission may be provided with a HARQ RTT of 2 ms, and 1 ms TTI transmissions may be provided with a HARQ RTT of 4 ms.

In the example, of FIG. 8, base station 105-*e* may transmit DL transmissions 805, and UE 115-*e* may transmit UL transmissions 810. The DL transmissions 805 and UL transmissions 810 may include both 1 ms TTI transmissions as well as slot TTI transmissions. In this example, subframe 0 may include sot 0 and slot 1, which may include QPDSCH DL transmissions 825 that may include a first slot transmission 815 in slot 0 and a second slot transmission 820 in slot 1. The DL transmissions 805 may include PDSCH transmission 830 that may use a 1 ms TTI. As indicated above, UE 115-*e* may receive QPDSCH transmissions 825 and provide HARQ feedback. In this example, QPUCCH ACK/NACK transmissions 835 may be transmitted by UE 115-*e* with a one TTI, or one slot gap, after the associated QPDSCH transmission 825. The base station 105-*e* may receive the QPUCCH ACK/NACK transmissions 835 and transmit, if needed, QPDSCH retransmission 840 of data having a NACK feedback. Because the slot TTI length is 0.5 ms, the LL HARQ RTT 845 of this example is 2 ms. Further, in this example, 1 ms TTI PDSCH transmission 830 may be received at UE 115-*e* which may provide PUCCH ACK/NACK feedback 850 with a one TTI, or one subframe gap, after the associated PDSCH transmission 830. The base station 105-*e* may receive the PUCCH ACK/NACK transmissions 850 and transmit, if needed, PDSCH retransmission 855 of data having a NACK feedback, one TTI or one subframe following the PUCCH ACK/NACK transmissions 850, thus providing a HARQ RTT 860 of 4 ms. Such a HARQ timeline may provide lower latency for both 1 ms and slot TTI transmissions.

In some examples, a single DL HARQ timeline may be configured for slot-level TTI, which may be selected based on latency requirements, UE capabilities, and the like. The corresponding legacy PDSCH timeline may still be legacy (8 ms) or reduced (e.g., 4 ms), which configurable on a per UE basis. In some examples, the modified 1 ms TTI HARQ timeline may be implemented for PDSCH transmissions scheduled from the UE-specific search space. In other examples, multiple DL HARQ timelines may be configured for multiple different UEs, and a particular HARQ timeline may be based on UE capability, operating conditions, channel conditions, traffic conditions, or any combination thereof. For example, if two slot-TTI HARQ timelines are available, such as a 2 ms RTT and 4 ms RTT, a UE may indicate its capability to a base station. If the UE indicates 4 ms RTT capability, the base station may configure that UE for 4 ms RTT. For a UE indicating capability for 2 ms RTT for slot-level TTI, the UE can be configured by the base station to use either 2 ms or 4 ms RTT for slot-TTI. In some examples, a UE can be further configured such that, if 2 ms RTT for slot-level TTI is configured, either a 4 ms RTT or a 8 ms RTT is to be used for 1-ms based TTI.

As discussed above, a base station (e.g., base station 105 of FIGS. 1-8) may transmit control information for 1 ms TTI and slot TTI transmissions using downlink control channels. As also indicated above, a UE may perform blind decoding over a search space to identify the control information. In some examples, blind decoding for QPDCCH or QePDCCH transmissions may be configured to provide UEs with reliable decoding for slot TTI control information. In some examples, due to relatively high processing requirements based on slot TTI timelines, blind decoding of DCI information and format may be provided that requires no or little pruning to rule out false alarms. In legacy PDCCH, for example, a UE may perform up to 44 blind decodes (w/o UL MIMO) or 60 blind decodes (w/UL MIMO) per CC. Additionally, for eCA examples with up to 32 CCs configured for a UE, the decoding candidates for a UE can be reduced and higher-layer configured on a per UE basis, in light of UE capability for performing blind decodes within timelines. In some examples, slot TTI control channels may be provided with a limited set of decoding candidates, limited possible DCI size(s), or any combination thereof. For example, a slot TTI may be configured to have a limited set of aggregation levels and limited number of decoding candidates for each aggregation level. Decoding candidates may be configured on a UE basis for each CC, in some examples. For example, a UE may be configured with a set of decoding candidates and a restriction on DCI format(s) (e.g., no more than 6 decoding candidates per slot and only one DCI format).

In some examples, a UE may be configured with a HARQ RTT-dependent restriction of decoding candidates. For example, if a UE is configured to have 1 ms TTI transmissions with a 4 ms HARQ RTT, a number of blind decodes may be reduced from the original $44/60$ blind decodes, and for slot TTI transmissions there may be separate restrictions of decoding candidates for 2 ms HARQ RTT and 4 ms HARQ RTT. In further examples, a base station may configure restricted blind decoding candidates for 1-ms TTI transmissions (PDCCH or ePDCCH) when slot-level TTI is configured for the UE. For example, if a CC is configured without slot TTI, the UE may be configured to perform up to $44/60$ blind decodes for PDCCH/ePDCCH, but if slot TTI is configured the UE may be configured to perform up to $32/48$ blind decodes for PDCCH/ePDCCH in a subframe for a CC and up to 6 blind decodes for QPDCCH/QePDCCH in each slot of a subframe for a CC, thus keeping the total number of blind decodes at a same level. In another example, legacy TTI DCIs may be only monitored in a common search space, while a UE-specific search space may only carry slot-TTI based DCIs.

Also as discussed above, in some examples a search space for 1 ms TTI control information and slot TTI control information may be configured to provide a UE with search spaces for receiving control information. For legacy PDCCH/ePDCCH transmissions, a search space may be derived by a UE's C-RNTI, random seeds, and the total control space size, and may also be a function of aggregation level. In some examples, slot TTI control information may follow a similar same mechanism for QPDCCH/QEPDCH transmissions. In certain examples, QPDCCH and PDCCH may have a correlated search space, in which the search space for QPDCCH is determined based on an identified search space for PDCCH. In some examples, the decoding candidates for QPDCCH may be a subset of those for PDCCH. In some examples, the original search space for PDCCH can be split to two parts, one for 1-ms TTI, and one for slot TTI. Having such a correlated search space for QPDCCH and PDCCH may help reduce complexity at a UE, as a collection of samples can be used for decoding for both QPDCCH and PDCCH. Thus, the search space defined for PDCCH can be used for both PDCCH and QPDCCH, but different restrictions of the set of candidates to monitor for PDCCH and QPDCCH can be defined, including possibly different DCI sizes and/or formats. In other examples, a separate search space may be configured for QPDCCH and PDCCH, such as by having the QPDCCH search space offset with respect to the PDCCH search space, or generated by a separate radio network temporary (RNTI) and/or different random seeds. Such correlation of search spaces may be possible for slot 0 transmissions, but not for slot 1 transmissions because there is no legacy PDCCH search space in slot 1. Thus, for slot 1, the QPDCCH search space may be different that of PDCCH, as will be discussed in further detail below with reference to FIG. 9. It is to be noted that the correlation of search space is also applicable to ePDCCH and QePDCCH.

As mentioned earlier, in some examples a single DCI format may be configured per link (DL or UL). For example, a UE may be configured to monitor DCI format 1A for 1 ms TTI, and to monitor a mode-dependent DCI format for slot TTI. In some examples, a separate DCI format may be provided for slot TTI control information. The DCI size for slot TTI may be smaller than that of legacy control channels, as a resource allocation size may be smaller (e.g., in a 20 MHz system). For example, for contiguous resource allocation, legacy DCI format 1A resource allocation size is log 2((100+1)*100/2), which is 13 bits. If slot TTI is configured with a 2-RB resource allocation granularity, the resource allocation size may be log 2((50+1)/50), which is 11 bits (2 bits less than 1 ms TTI). For bit-map based resource allocation, the legacy resource allocation needs 25 bits (each bit indicates a RB group (RBG) of 4 RBs), and for slot-TTI such a resource allocation may be 13 bits if a new RB group is 8 RBs, which results in a 12-bit reduction. In some examples, the RBG size for slot-TTI may also be configurable or dynamically indicated. Further DCI size reductions may come from not using transmit power control (TPC) in slot TTI DCI, and relying on the legacy DCI for power control, which may result in two fewer bits in slot TTI DCI. Additionally, the 5-bit MCS in legacy DCI may be reduced to a 3-bit MCS in some examples. In such examples, the three bits may be mapped to different MCS values and may be specifically configured per UE, and such mapping may be updated periodically (e.g., via radio resource control (RRC) signaling or a SIB). Furthermore, the 2-bit redundancy version of legacy DCI may be omitted or reduced to one-bit, and if configured with a 2 ms HARQ RTT only a 2-bit HARQ process ID is necessary (vs. legacy 3-bit). Thus, the DCI for slot TTI may be reduced from the DCI size of legacy 1 ms TTI.

In some examples, a same DCI size may be used for both 1-ms TTI and slot TTI control information, with some of the 1 ms TTI information fields re-interpreted to provide additional or different information. In such cases, differentiation of whether a DCI schedules a 1-ms TTI or a slot TTI can be based on search space (e.g., a DCI in common search space is for 1-ms TTI, while a DCI in UE-specific search space is for slot TTI), an indication in the DCI, or any combination thereof. In one example, the slot TTI DCI format may include an indication of scheduling slot 0, slot 1, or slot 0 and slot 1, each with slot TTI, or a 1-ms TTI. In further examples, the slot TTI DCI may use a 24-bit CRC (instead of 16-bit CRC for 1 ms TTI DCI). Such an increased CRC size may be accommodated by the fewer bits for slot TTI DCI, as discussed above, and may reduce or eliminate the need for a UE to perform pruning to reduce false alarm likelihood.

As mentioned above, QPDCCH in the second slot may be configured separately than QPDCCH in the first slot. Because there is no legacy control in the second slot, and legacy PDSCH may utilize this slot, QPDCCH in the second slot, in various examples, is configured to co-exist with legacy PDSCH. For example, PBCH may be present in the center 6 RBs of the first to fourth symbols of the second slot in subframe 0 of every frame. Furthermore, a cell-specific reference signal (CRS) may be present only in the data region of the second slot of a multicast-broadcast single-frequency network (MBSFN) subframe, thus making CRS-based QPDCCH more difficult to support. In some examples, instead of defining the second slot search space over the entire system bandwidth as in PDCCH or QPDCCH in the first slot, the QPDCCH search space in the second slot may be defined based on a set of RBs configured by the base station. Such RBs may or may not collide with PBCH, and in the case of time division duplexing (TDD) may or may not collide with a SSS in the last symbol of subframes 0 and 5. In the event that a decoding candidate collides with PBCH or SSS, the candidate may be omitted for monitoring. Such a configuration may be based on a bitmap with one RB, or RBG, granularity.

In some examples, one or more sets of RBs may be configured for QPDCCH in the second slot, in a similar manner as ePDCCH. For example, up to two sets of RBs may be configured for a UE, where each set may self-contain a search space monitored by a UE. In some examples, a REG based solution may be used, in a similar manner as to legacy PDCCH. In some examples, two modes may be supported, one distributed in which a CCE is mapped to REGs of different RBs as much as possible, which may provide enhanced robustness and frequency diversity. The other mode may be a localized mode, where a CCE is mapped to REGs of s smaller number of RBs as much as possible, which may provide more efficient multiplexing with QPDSCH and PDSCH. The time span of control information resources (e.g., number of symbols) for QPDCCH may be predefined in some examples (e.g., only 1 symbol, symbol 0), may be layer 3 configured (e.g., symbol 0 only, symbol0+symbol1, etc.), or dynamically indicated. Furthermore, in some cases the time span of the control information may be different for different sets of RBs when two or more sets of RBs are configured. Additionally or alternatively, the time span may be tied with HARQ RTT. For example, if 2 ms RTT is configured, the time span may be limited to no more than the first 3 symbols, but if 4 ms RTT is configured the time span may be up to 7 symbols or the entire slot.

While various of the above examples are directed to PDCCH and QPDCCH (or ePDCCH/QePDCCH), other control channels also may be present in the second slot in slot TTIs. For example, PCFICH may be in the second slot in some examples, while in other examples may not be present in the second slot. In examples where PCFICH is in the second slot, it may use the same mechanism as that of the PCFICH in the first slot. In some examples, the RBs configured for PCFICH in the second slot may be based on a RRC configuration instead of based on the entire system bandwidth (e.g., the PCFICH RE locations can be implicitly derived based on the set of RBs configured for QPDCCH). In certain examples, two sets of QPDCCH may be configured at a UE, and each set may have its own PCFICH. Some examples may utilize legacy PCFICH in both the first slot and second slot, and the control region in each of the slots may be the same. In some cases, a base station may balance the control channel for 1-ms TTI UES and slot TTI UEs in the first slot and the second slot to provide good alignment of the control region size (e.g., the number of symbols for control). In some examples, PHICH may be present in the first slot but not the second slot, which may allow for asynchronous UL HARQ for slot TTI communications.

Figure 9:
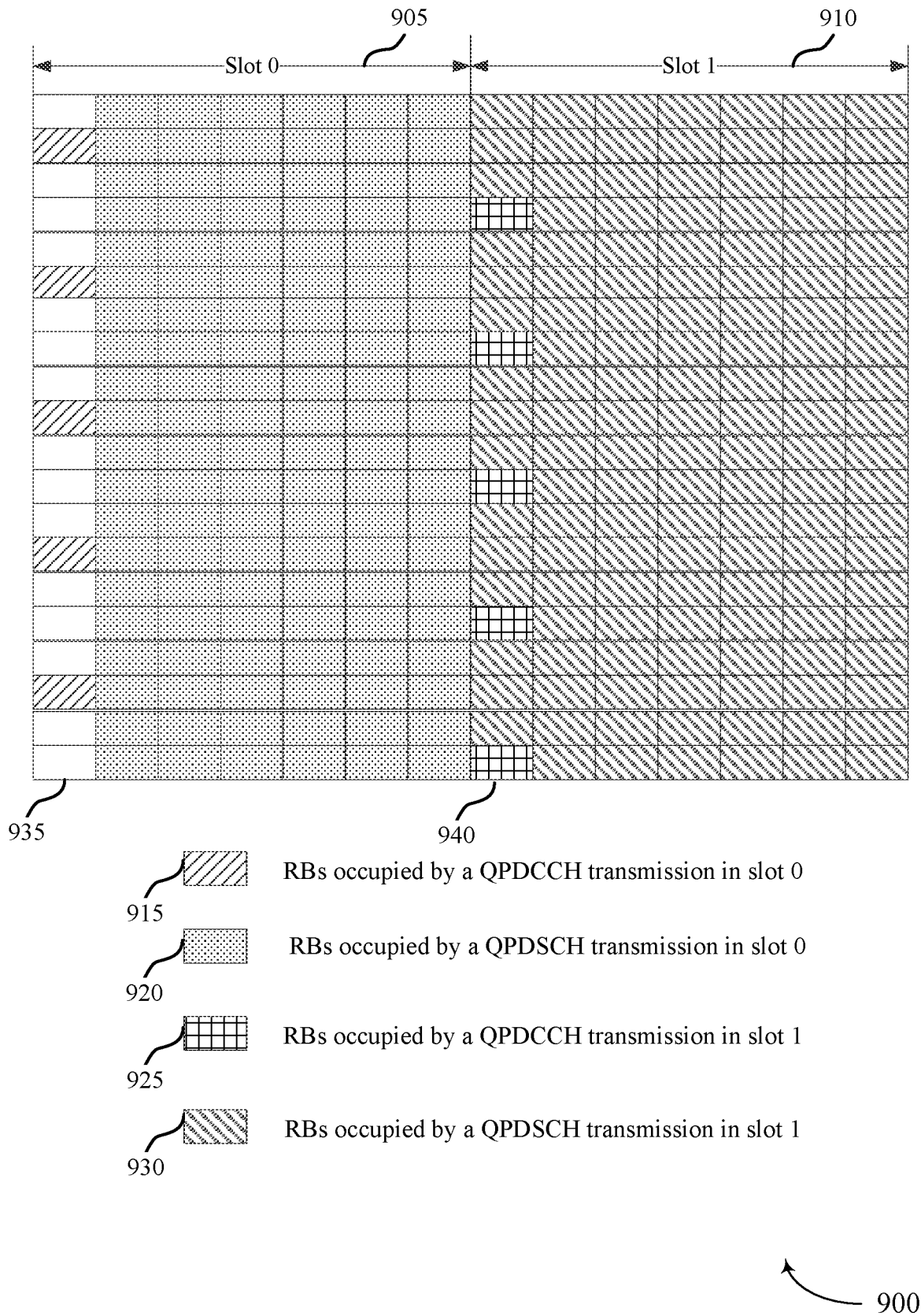
FIG. 9 illustrates an example of a wireless subframe that supports control channel signaling with multiple TTI lengths in accordance with aspects of the present disclosure.

FIG. 9 illustrates an example of a subframe 900 for control channel signaling with multiple TTI lengths. In some cases, subframe 900 may represent aspects of techniques performed by a UE 115 or base station 105 as described with reference to FIGS. 1-8. In the example of FIG. 9, multiplexing with QPDSCH resources may include pure time division multiplexing (TDM) or TDM/FDM, depending upon the slot.

As illustrated in FIG. 9, subframe 900 may include a first slot 905 and a second slot 910. The first slot 905 may include RBs occupied by a QPDCCH transmission in 915 that are located in a first symbol 935 of first slot 905. In the first slot 905, the first symbol 935 may include only control information, and RBs occupied by a PDSCH transmission 920 in the first slot may be located only following the first symbol 935 of the first slot. Thus, control information in the first slot 905 may be in a purely TDM relationship with shared channel data in the first slot 905. In the second slot 910, RBs occupied by a QPDCCH transmission 925 may be located in a first symbol 940 of the second slot 910, and RBs occupied by a QPDSCH transmission 930 may be in a FDM relationship with QPDCCH transmissions in this symbol. Thus, RBs occupied by a QPDCCH transmission 925 may be multiplexed with RBs occupied by a QPDSCH transmission 930 using both TDM and FDM. Such a multiplexing scheme implies that a QPDSCH may have different start symbols in different RBs. In some cases, for RBs not part of the RBs configured as part of the QPDCCH search space in the second slot 910, QPDSCH can always start from the first symbol 940 of the second slot 910. In other cases, for RBs occupied by the corresponding QPDCCH, QPDSCH can start in a symbol immediately after the last symbol of the corresponding QPDCCH. In further cases, for RBs not occupied by the corresponding QPDCCH, but part of the RBs configured for QPDCCH search space in the second slot, the starting symbol can follow either of the other cases, and in some examples, a base station may dynamically or semi-statically indicate whether QPDSCH can start from the first symbol 940 of the second slot 910 or after the last symbol of the configured QPDCCH search space. In another example, a starting symbol for a RB for QPDSCH may also be configured by higher layers. Note that it is possible that a first group of RBs may be configured with a first starting symbol, while a second group of RBs may be configured with a second start symbol. The management of starting symbol may also be applicable to QePDCCH. For example, two sets of QePDCCH resources may be configured, and each set may be further associated with a respective starting symbol configured by the base station.

Figure 10:
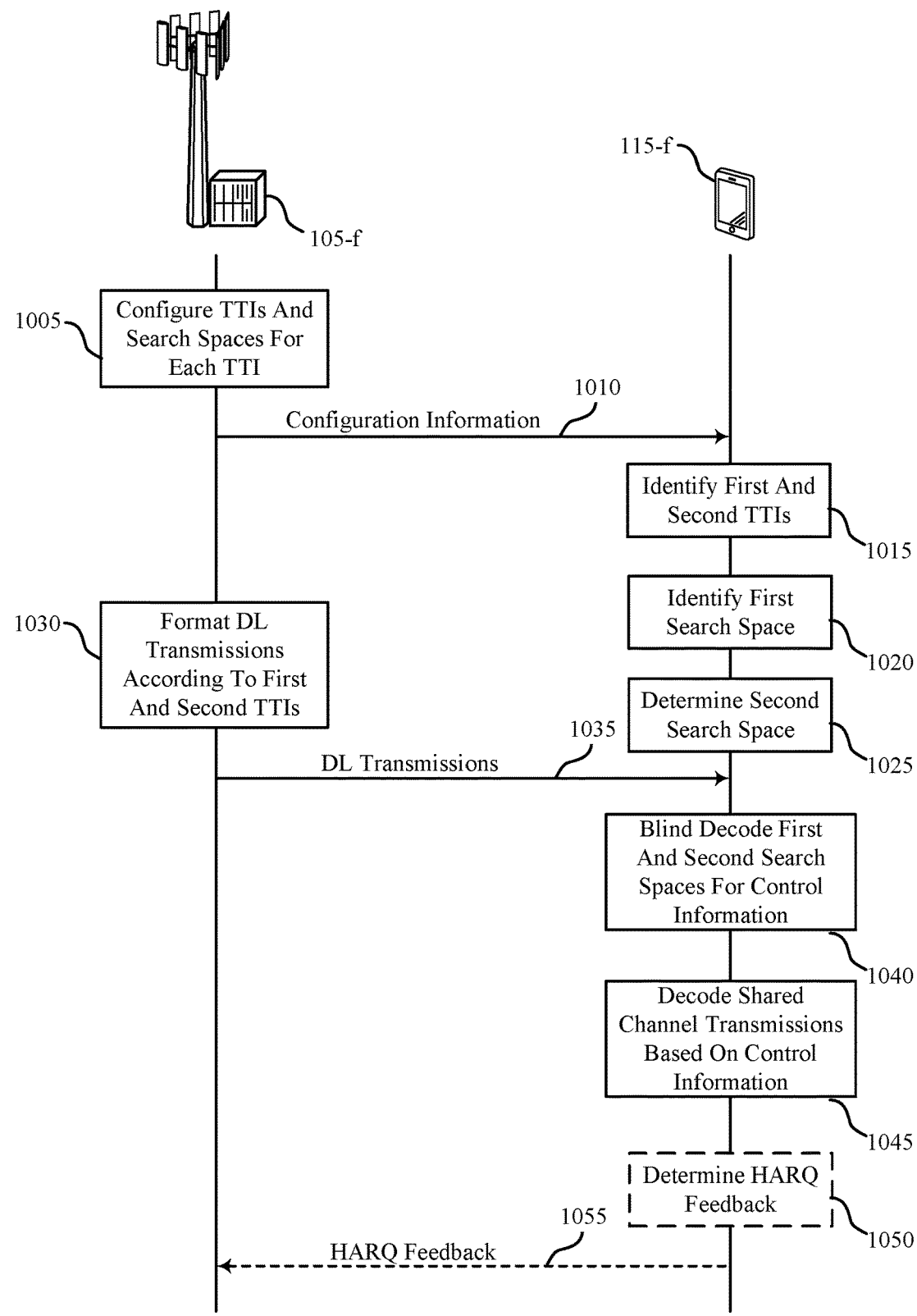
FIG. 10 illustrates an example of a process flow in a system that supports control channel signaling with multiple TTI lengths in accordance with aspects of the present disclosure.

FIG. 10 illustrates an example of a process flow 1000 for control channel signaling with multiple TTI lengths in accordance with various aspects of the present disclosure. Process flow 1000 may include base station 105-*f* and UE 115-*f*, which may be examples of the corresponding devices described with reference to FIG. 1-9.

At block 1005, the base station 105-*f* may configure TTIs and search spaced for each TTI. Base station 105-*f* may, for example, configure both 1 ms TTIs and slot TTIs for UE 115-*f*, and may configure a search space for control information of the slot TTIs to be correlated to a search space for 1 ms TTIs. The base station 105-*f* may transmit the configuration information 1010 to UE 115-*f*. The UE 115-*f* may, at block 1015, identify the first and second TTIs, such as 1 ms TTIs and slot TTIs. The UE 115-*f* at block 1020 may then identify a first search space associated with the first TTI (e.g., a search space for the 1 ms TTI). At block 1025, the UE 115-*f* may determine a second search space, which may be determined based at least in part on the first search space, in some examples.

At block 1030, the base station 105-*f* may format downlink transmissions according to the first TTI and the second TTI, and may transmit downlink transmissions 1035. The UE may monitor the first search space and/or the second search space for DL transmissions, and at block 1040, the UE 115-*f* may blind decode the first and second search spaces for control information associated with the different TTI transmissions. Based on decoded control information for transmissions of each TTI, the UE 115-*f* at block 1045 may decode shared channel transmissions. At optional block 1050, the UE 115-*f* may determine HARQ feedback associated with the shared channel transmissions and transmit the HARQ feedback 1055 to the base station 105-*f*, in a manner as discussed above with respect to FIGS. 5-8.

Figure 11:
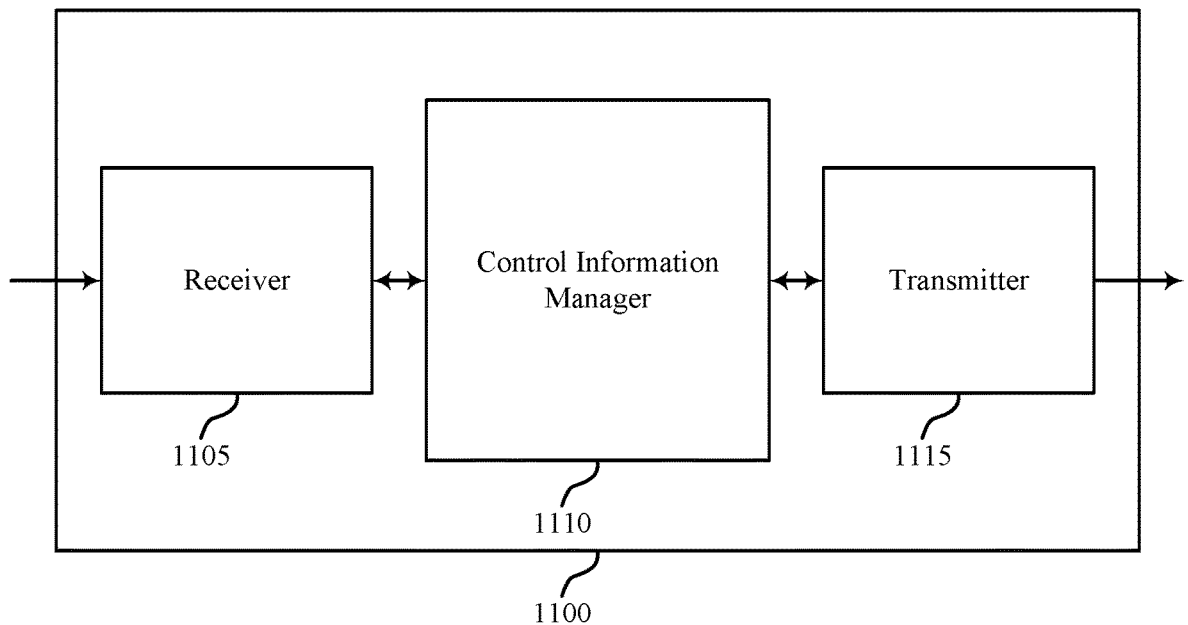
FIGS. 11 through 13 show block diagrams of a wireless device that supports control channel signaling with multiple TTI lengths in accordance with aspects of the present disclosure.

FIG. 11 shows a block diagram of a wireless device 1100 that supports control channel signaling with multiple TTI lengths in accordance with various aspects of the present disclosure. Wireless device 1100 may be an example of aspects of a UE 115 described with reference to FIGS. 1 and 2. Wireless device 1100 may include receiver 1105, control information manager 1110 and transmitter 1115. Wireless device 1100 may also include a processor. Each of these components may be in communication with each other.

The receiver 1105 may receive information such as packets, user data, or control information associated with various information channels (e.g., control channels, data channels, and information related to control channel signaling with multiple TTI lengths, etc.). Information may be passed on to other components of the device. The receiver 1105 may be an example of aspects of the transceiver 1425 described with reference to FIG. 14.

The control information manager 1110 may identify a first TTI having a first duration that comprises two or more symbol periods and a second TTI having a second duration that is less than the first duration, identify a first search space for monitoring for first control information associated with the first TTI, determine, based on the first search space, a second search space for monitoring for second control information associated with the second TTI, and monitor at least one of the first search space for the first control information or the second for the second control information. The control information manager 1110 may also be an example of aspects of the control information manager 1405 described with reference to FIG. 14.

The transmitter 1115 may transmit signals received from other components of wireless device 1100. In some examples, the transmitter 1115 may be collocated with a receiver in a transceiver module. For example, the transmitter 1115 may be an example of aspects of the transceiver 1425 described with reference to FIG. 14. The transmitter 1115 may include a single antenna, or it may include a plurality of antennas.

Figure 12:
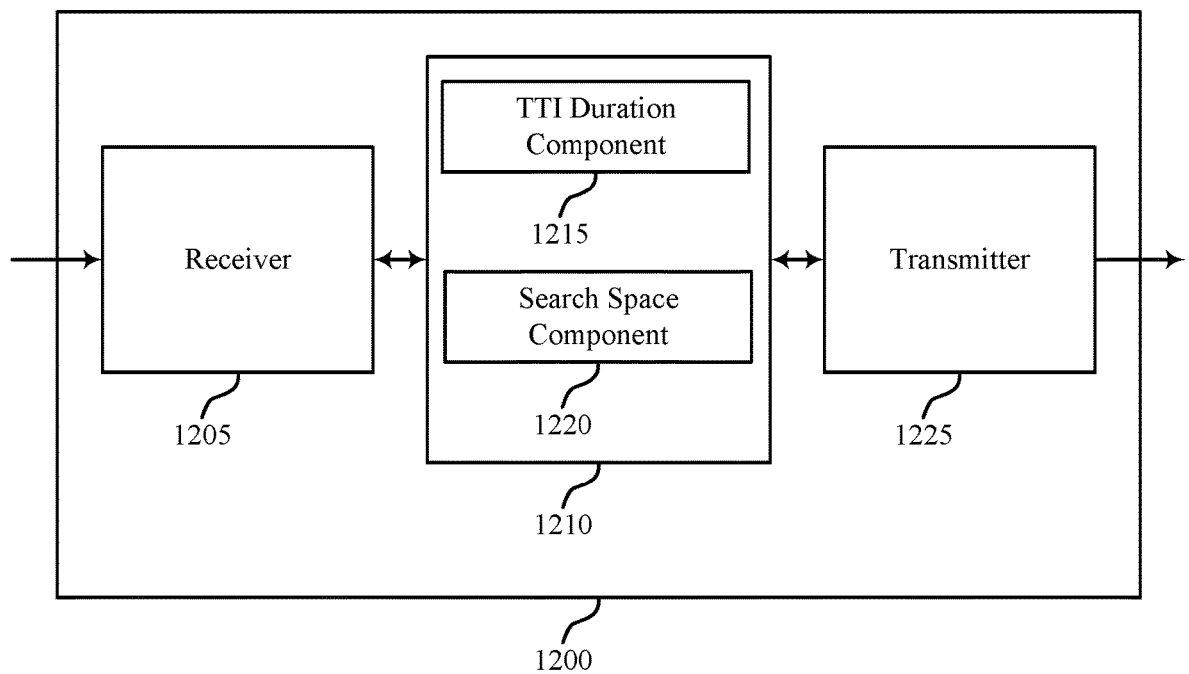

FIG. 12 shows a block diagram of a wireless device 1200 that supports control channel signaling with multiple TTI lengths in accordance with various aspects of the present disclosure. Wireless device 1200 may be an example of aspects of a wireless device 1100 or a UE 115 described with reference to FIGS. 1, 2 and 11. Wireless device 1200 may include receiver 1205, control information manager 1210 and transmitter 1225. Wireless device 1200 may also include a processor. Each of these components may be in communication with each other.

The receiver 1205 may receive information which may be passed on to other components of the device. The receiver 1205 may also perform the functions described with reference to the receiver 1105 of FIG. 11. The receiver 1205 may be an example of aspects of the transceiver 1425 described with reference to FIG. 14.

The control information manager 1210 may be an example of aspects of control information manager 1110 described with reference to FIG. 11. The control information manager 1210 may include TTI duration component 1215 and search space component 1220. The control information manager 1210 may be an example of aspects of the control information manager 1405 described with reference to FIG. 14.

The TTI duration component 1215 may identify a first TTI having a first duration that comprises two or more symbol periods and a second TTI having a second duration that is less than the first duration.

The search space component 1220 may identify a first search space for monitoring for first control information associated with the first TTI, and determine, based on the first search space, a second search space for monitoring for second control information associated with the second TTI. In some examples, the first and second search spaces may be located in a first slot of a subframe, and the search space component may determine a third search space in a second slot for monitoring for the second subset of second control information, In some cases, the second search space is a subset of the first search space. In some cases, the determining the second search space comprises: deriving the second search space based on one or more of a second UE network identifier or a random seed. In some cases, the first control information comprises first DCI having a first DCI size and a first DCI format, and the second control information comprises second DCI having a second DCI size and a second DCI format, and where one or more of the first DCI size and the second DCI size or the first DCI format and the second DCI format is different.

In some cases, the first DCI size is larger than the second DCI size. In some cases, the first DCI size and second DCI size are the same, and where one or more bits of the second DCI provide different information than corresponding bits in the first DCI. In some cases, the first DCI includes a first number of CRC bits, and the second DCI includes a second number of CRC bits that is greater than the first number of CRC bits. In some cases, the second control information comprises a first subset of second control information transmitted in a first slot of a wireless transmission subframe and a second subset of second control information transmitted in a second slot of the wireless transmission subframe.

In some cases, the first subset transmitted in the first slot of the wireless transmission subframe is transmitted in a control channel that is time division multiplexed with shared channel data transmissions in the first slot, and the second subset transmitted in the second slot of the wireless transmission subframe is transmitted in a second control channel that is both time division multiplexed and frequency division multiplexed with shared channel data transmissions in the second slot. In some cases, the third search space is determined based on a set of RBs of the second slot configured for control information transmissions.

In some cases, the first search space and second search space are distributed over a system bandwidth for transmissions in the first slot, and where the third search space is distributed over a subset of the system bandwidth. In some cases, the third search space is determined based on a transmission mode associated with the second control information. In some cases, the second subset of second control information comprises one or more of PDCCH information or PCFICH information transmitted in a second slot of the wireless transmission subframe. In some cases, the second search space is correlated to the first search space.

The transmitter 1225 may transmit signals received from other components of wireless device 1200. In some examples, the transmitter 1225 may be collocated with a receiver in a transceiver module. For example, the transmitter 1225 may be an example of aspects of the transceiver 1425 described with reference to FIG. 14. The transmitter 1225 may utilize a single antenna, or it may utilize a plurality of antennas.

Figure 13:
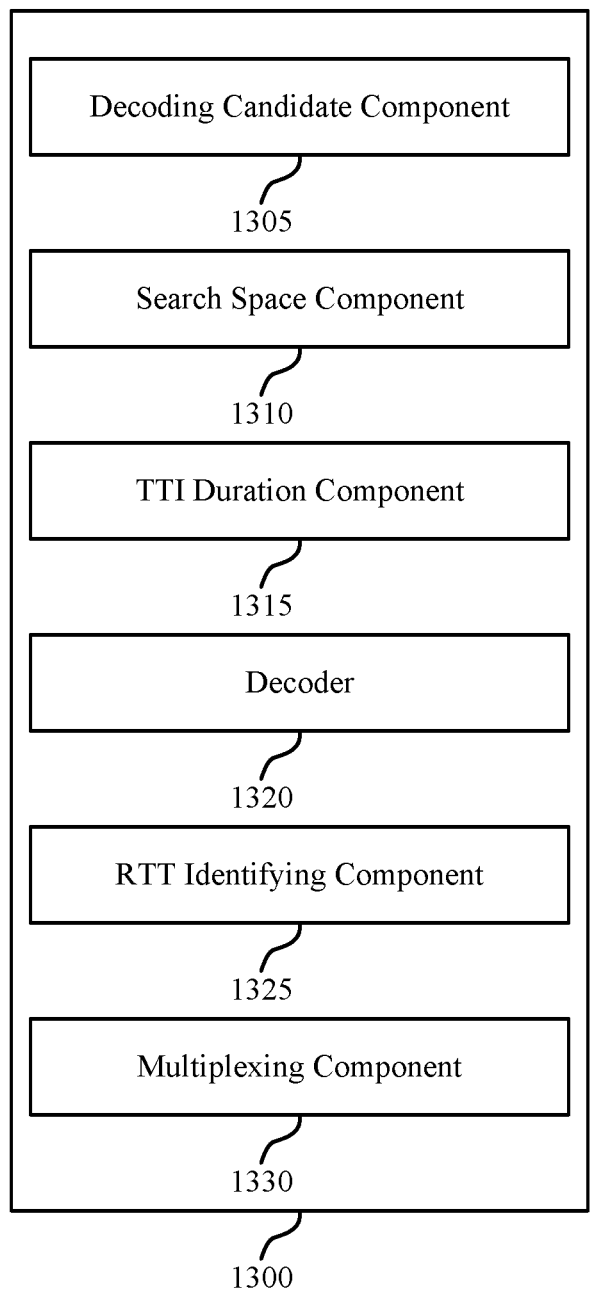

FIG. 13 shows a block diagram of a control information manager 1300 which may be an example of the corresponding component of wireless device 1100 or wireless device 1200. That is, control information manager 1300 may be an example of aspects of control information manager 1110 or control information manager 1210 described with reference to FIGS. 11 and 12. The control information manager 1300 may also be an example of aspects of the control information manager 1405 described with reference to FIG. 14.

The control information manager 1300 may include decoding candidate component 1305, search space component 1310, TTI duration component 1315, decoder 1320, HARQ component 1325 and multiplexing component 1330. Each of these modules may communicate, directly or indirectly, with one another (e.g., via one or more buses).

The decoding candidate component 1305 may identify a first subset of the decoding candidates as being in the first search space, and identify a set of blind decoding candidates for blind decoding transmissions received in the first and second search spaces. The set of blind decoding candidates may be based on one or more of an available number of aggregation levels for second TTI transmissions, an available DCI format for the second control information. In some examples, the decoding candidate component 1305 may identify a set of blind decoding candidates for blind decoding transmissions received in the second search space based on a RTT for HARQ feedback associated with the second control information.

In some cases, the identifying the first search space comprises: deriving a set of decoding candidates for decoding of received wireless transmissions and identification of the first control information and the second control information. In some cases, the determining the second search space comprises: identifying a second subset of the decoding candidates as being in the second search space. In some cases, the first subset of decoding candidates and the second subset of decoding candidates are non-overlapping subsets of the set of decoding candidates. In some cases, the deriving is based on one or more of a UE network identifier, a random seed, or a total size available for control information. In some cases, a different set of blind decoding candidates for the first search space is identified when transmissions using the second TTI are configured than when transmissions using the second TTI are not configured.

The search space component 1310 may determine a third search space in the second slot for monitoring for the second subset of second control information, identify a first search space for monitoring for first control information associated with the first TTI, and determine, based on the first search space, a second search space for monitoring for second control information associated with the second TTI.

The TTI duration component 1315 may identify a first TTI having a first duration that comprises two or more symbol periods and a second TTI having a second duration that is less than the first duration.

The decoder 1320 may blind decode wireless transmissions received in the first search space for the first control information, and blind decode wireless transmissions received in the second search space for the second control information.

The HARQ component 1325 may identify a first RTT for HARQ feedback associated with the first control information, and identify a second RTT for HARQ feedback associated with the second control information, where the second RTT is shorter than the first RTT. In some cases, the second RTT is determined based on a capability of a UE receiving the second control information. In some cases, the first RTT is determined to be a legacy RTT or a shorter RTT than the legacy RTT based on a capability of the UE.

The multiplexing component 1330 may determine a starting symbol for the shared channel data transmissions in the second slot based on one or more of a configured starting symbol location or a symbol location of the second subset of second control information, and determine a starting symbol for the shared channel data transmissions in the second slot based on the third search space.

Figure 14:
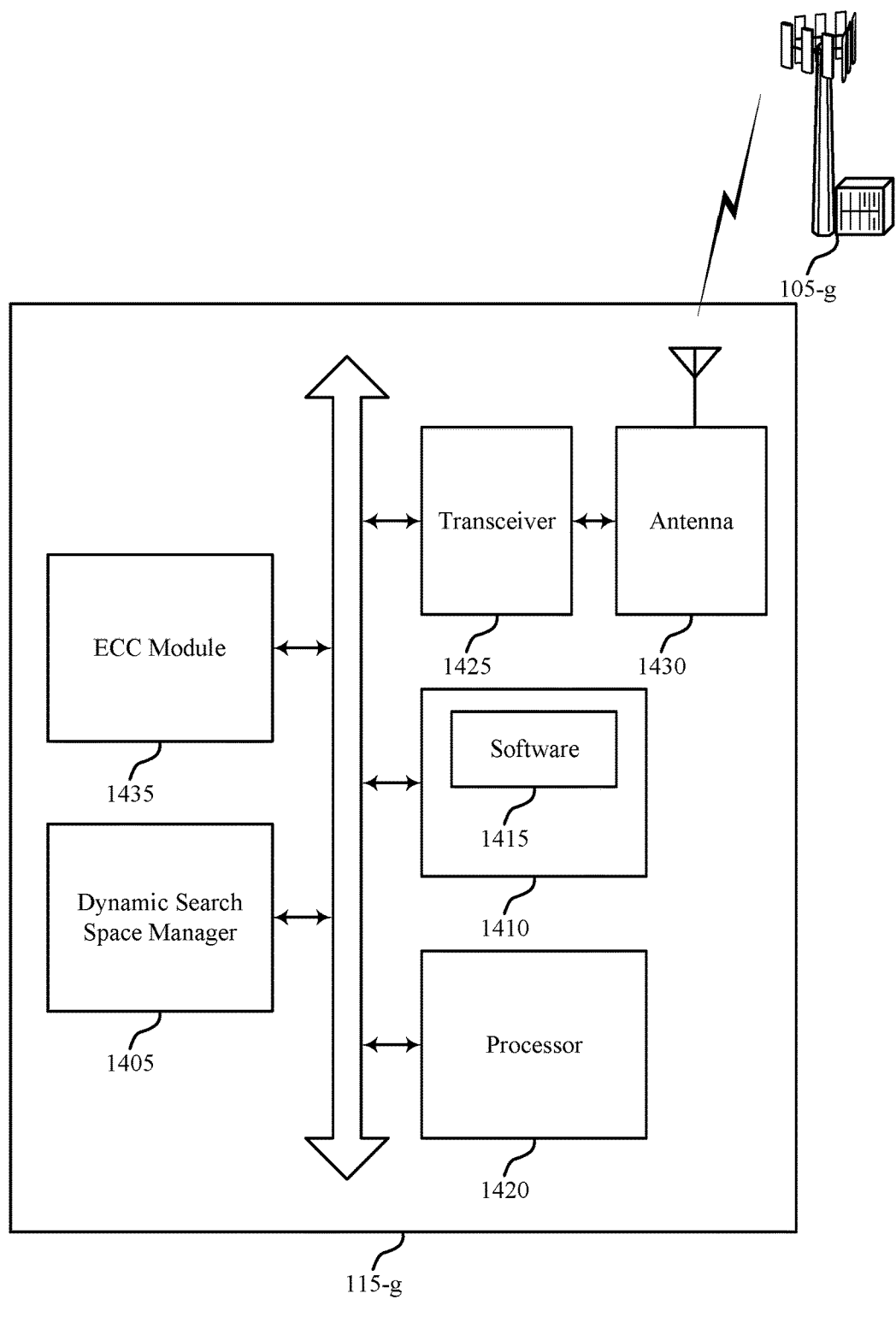
FIG. 14 illustrates a block diagram of a system including a UE that supports control channel signaling with multiple TTI lengths in accordance with aspects of the present disclosure.

FIG. 14 shows a diagram of a system 1400 including a device that supports control channel signaling with multiple TTI lengths in accordance with various aspects of the present disclosure. For example, system 1400 may include UE 115-g, which may be an example of a wireless device 1100, a wireless device 1200, or a UE 115 as described with reference to FIGS. 1 through 13.

UE 115-g may also include control information manager 1405, memory 1410, processor 1420, transceiver 1425, antenna 1430 and ECC module 1435. Each of these modules may communicate, directly or indirectly, with one another (e.g., via one or more buses). The control information manager 1405 may be an example of a control information manager as described with reference to FIGS. 11 through 13.

The memory 1410 may include random access memory (RAM) and read only memory (ROM). The memory 1410 may store computer-readable, computer-executable software including instructions that, when executed, cause the processor to perform various functions described herein (e.g., control channel signaling with multiple TTI lengths, etc.). In some cases, the software 1415 may not be directly executable by the processor but may cause a computer (e.g., when compiled and executed) to perform functions described herein. The processor 1420 may include an intelligent hardware device, (e.g., a central processing unit (CPU), a microcontroller, an application specific integrated circuit (ASIC), etc.)

The transceiver 1425 may communicate bi-directionally, via one or more antennas, wired, or wireless links, with one or more networks, as described above. For example, the transceiver 1425 may communicate bi-directionally with a base station 105 or a UE 115. The transceiver 1425 may also include a modem to modulate the packets and provide the modulated packets to the antennas for transmission, and to demodulate packets received from the antennas. In some cases, the wireless device may include a single antenna 1430. However, in some cases the device may have more than one antenna 1430, which may be capable of concurrently transmitting or receiving multiple wireless transmissions.

The ECC module 1435 may enable operations using ECCs such as communication using shared or unlicensed spectrum, using reduced length TTIs or subframe durations, or using a large number of CCs.

Figure 15:
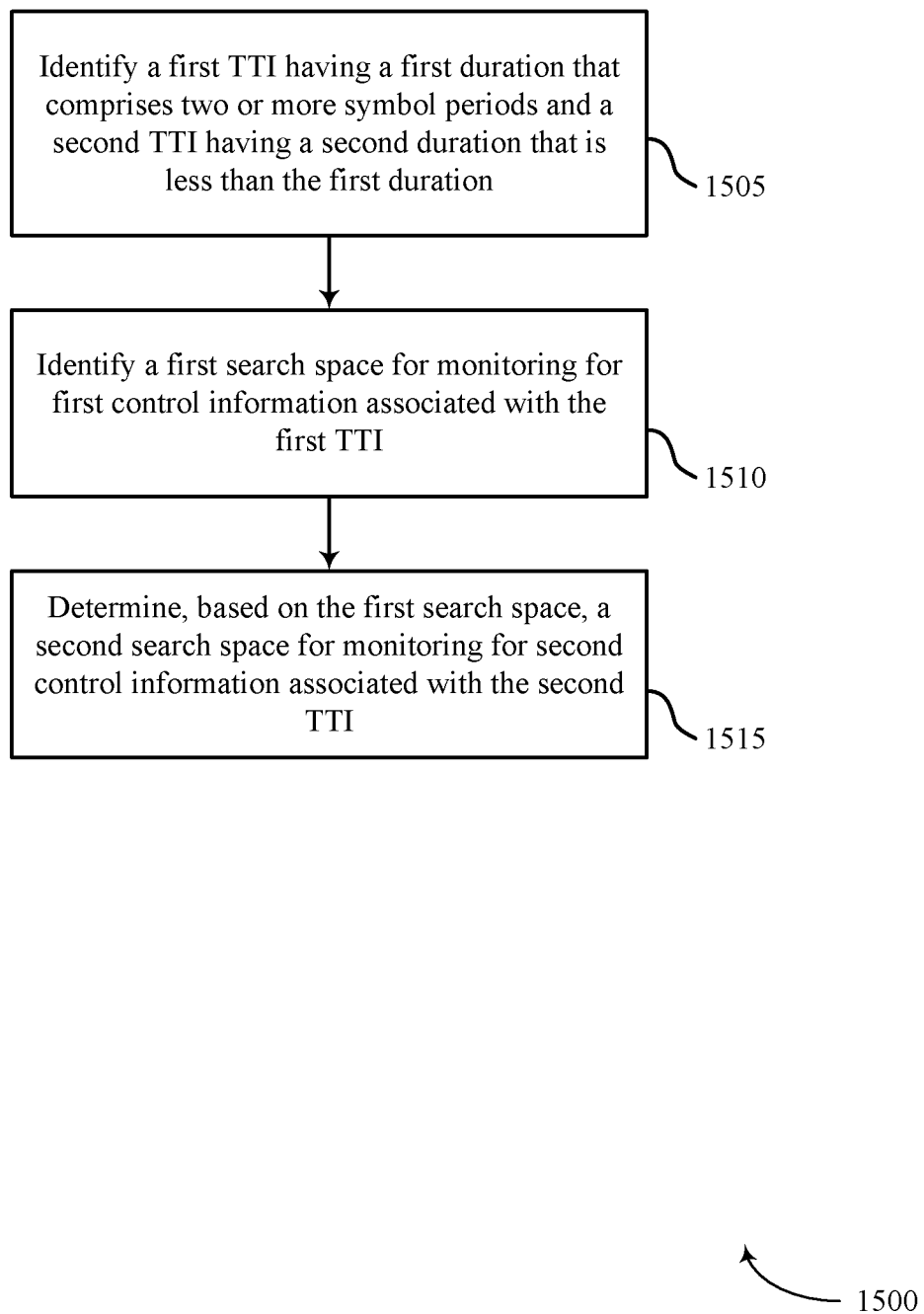
FIGS. 15 through 19 illustrate methods for control channel signaling with multiple TTI lengths in accordance with aspects of the present disclosure.

FIG. 15 shows a flowchart illustrating a method 1500 for control channel signaling with multiple TTI lengths in accordance with various aspects of the present disclosure. The operations of method 1500 may be implemented by a device such as a UE 115 or its components as described with reference to FIGS. 1 and 2. For example, the operations of method 1500 may be performed by the control information manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may identify a first TTI having a first duration that comprises two or more symbol periods and a second TTI having a second duration that is less than the first duration as described above with reference to FIGS. 2 through 10. In certain examples, the operations of block 1505 may be performed by the TTI duration component as described with reference to FIGS. 12 and 13.

At block 1510, the UE 115 may identify a first search space for monitoring for first control information associated with the first TTI as described above with reference to FIGS. 2 through 10. In certain examples, the operations of block 1510 may be performed by the search space component as described with reference to FIGS. 12 and 13.

At block 1515, the UE 115 may determine, based on the first search space, a second search space for monitoring for second control information associated with the second TTI as described above with reference to FIGS. 2 through 10. In certain examples, the operations of block 1515 may be performed by the search space component as described with reference to FIGS. 12 and 13. The UE 115 may then monitor at least one of the first search space for the first control information or the second for the second control information, as discussed above with respect to FIGS. 2 through 10.

Figure 16:
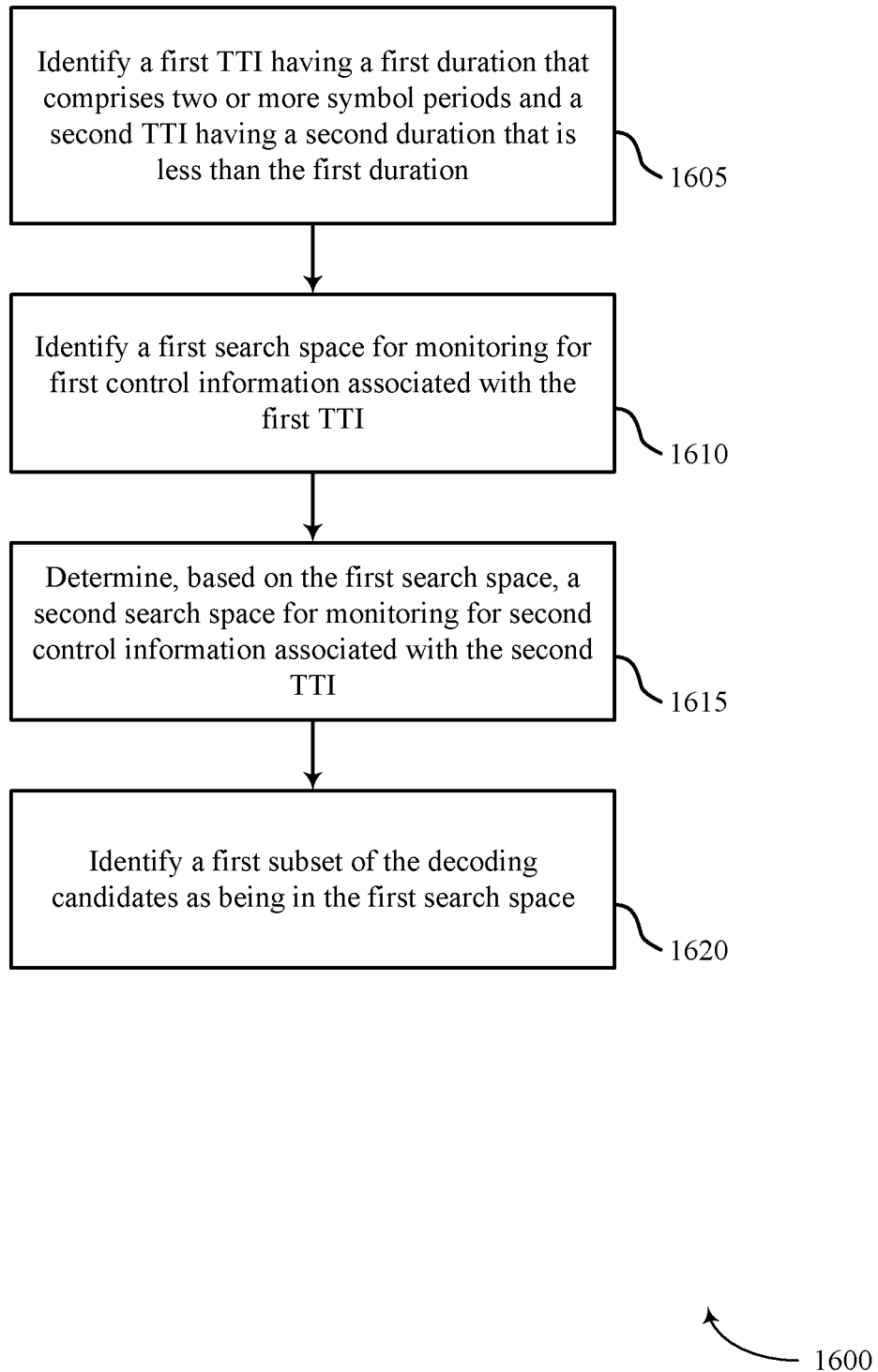

FIG. 16 shows a flowchart illustrating a method 1600 for control channel signaling with multiple TTI lengths in accordance with various aspects of the present disclosure. The operations of method 1600 may be implemented by a device such as a UE 115 or its components as described with reference to FIGS. 1 and 2. For example, the operations of method 1600 may be performed by the control information manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may identify a first TTI having a first duration that comprises two or more symbol periods and a second TTI having a second duration that is less than the first duration as described above with reference to FIGS. 2 through 10. In certain examples, the operations of block 1605 may be performed by the TTI duration component as described with reference to FIGS. 12 and 13.

At block 1610, the UE 115 may identify a first search space for monitoring for first control information associated with the first TTI as described above with reference to FIGS. 2 through 10. In some cases, the identifying the first search space comprises: deriving a set of decoding candidates for decoding of received wireless transmissions and ID of the first control information and the second control information. In certain examples, the operations of block 1610 may be performed by the search space component as described with reference to FIGS. 12 and 13.

At block 1615, the UE 115 may determine, based on the first search space, a second search space for monitoring for second control information associated with the second TTI as described above with reference to FIGS. 2 through 10. In some cases, the determining the second search space comprises: identifying a second subset of the decoding candidates as being in the second search space. In certain examples, the operations of block 1615 may be performed by the search space component as described with reference to FIGS. 12 and 13.

At block 1620, the UE 115 may identify a first subset of the decoding candidates as being in the first search space as described above with reference to FIGS. 2 through 10. In certain examples, the operations of block 1620 may be performed by the decoding candidate component as described with reference to FIGS. 12 and 13.

Figure 17:
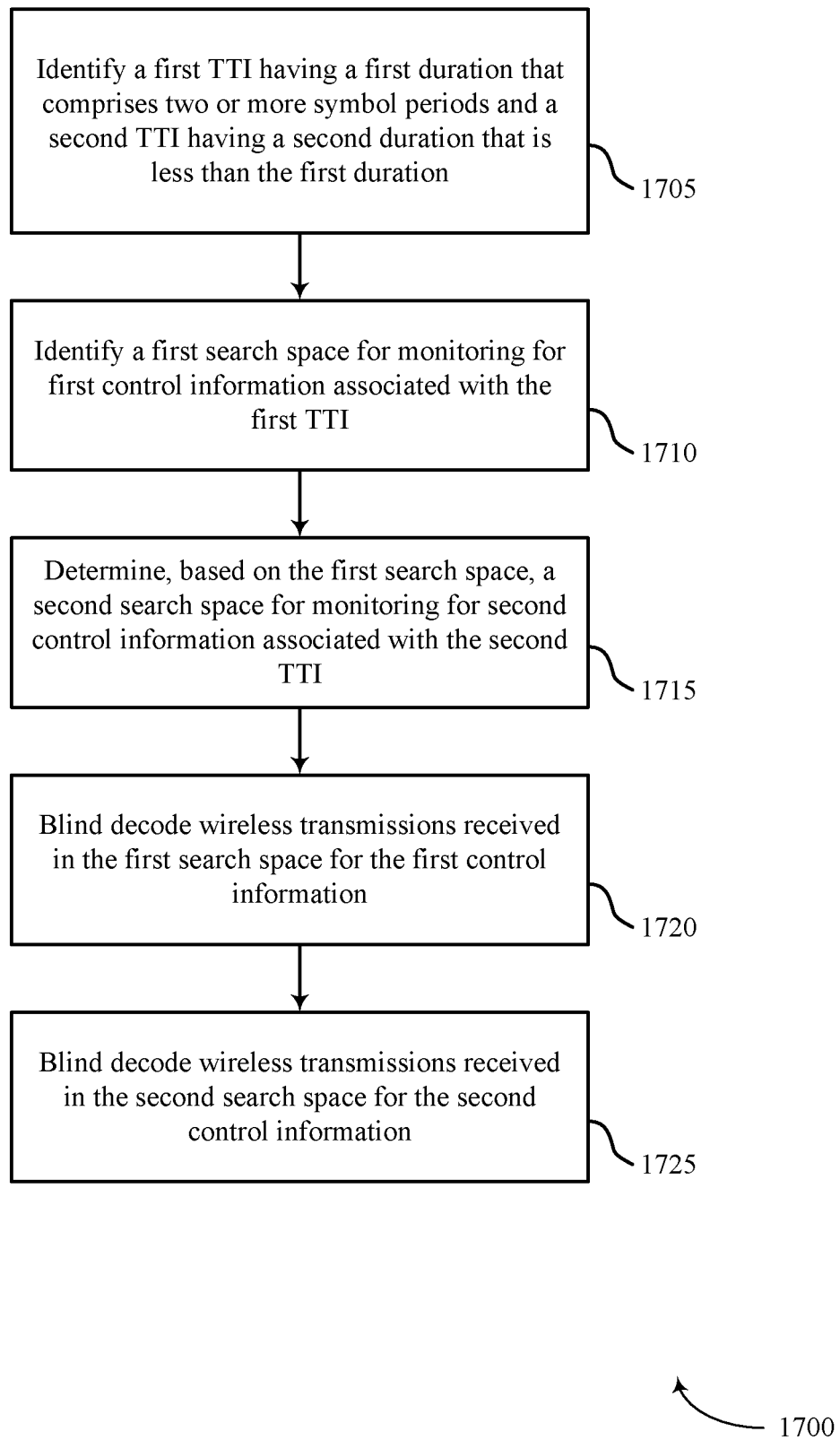

FIG. 17 shows a flowchart illustrating a method 1700 for control channel signaling with multiple TTI lengths in accordance with various aspects of the present disclosure. The operations of method 1700 may be implemented by a device such as a UE 115 or its components as described with reference to FIGS. 1 and 2. For example, the operations of method 1700 may be performed by the control information manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may identify a first TTI having a first duration that comprises two or more symbol periods and a second TTI having a second duration that is less than the first duration as described above with reference to FIGS. 2 through 10. In certain examples, the operations of block 1705 may be performed by the TTI duration component as described with reference to FIGS. 12 and 13.

At block 1710, the UE 115 may identify a first search space for monitoring for first control information associated with the first TTI as described above with reference to FIGS. 2 through 10. In certain examples, the operations of block 1710 may be performed by the search space component as described with reference to FIGS. 12 and 13.

At block 1715, the UE 115 may determine, based on the first search space, a second search space for monitoring for second control information associated with the second TTI as described above with reference to FIGS. 2 through 10. In certain examples, the operations of block 1715 may be performed by the search space component as described with reference to FIGS. 12 and 13.

At block 1720, the UE 115 may monitor the first search space and may blind decode wireless transmissions received in the first search space for the first control information as described above with reference to FIGS. 2 through 10. In certain examples, the operations of block 1720 may be performed by the decoder as described with reference to FIGS. 12 and 13.

At block 1725, the UE 115 may monitor the second search space and may blind decode wireless transmissions received in the second search space for the second control information as described above with reference to FIGS. 2 through 10. In certain examples, the operations of block 1725 may be performed by the decoder as described with reference to FIGS. 12 and 13.

Figure 18:
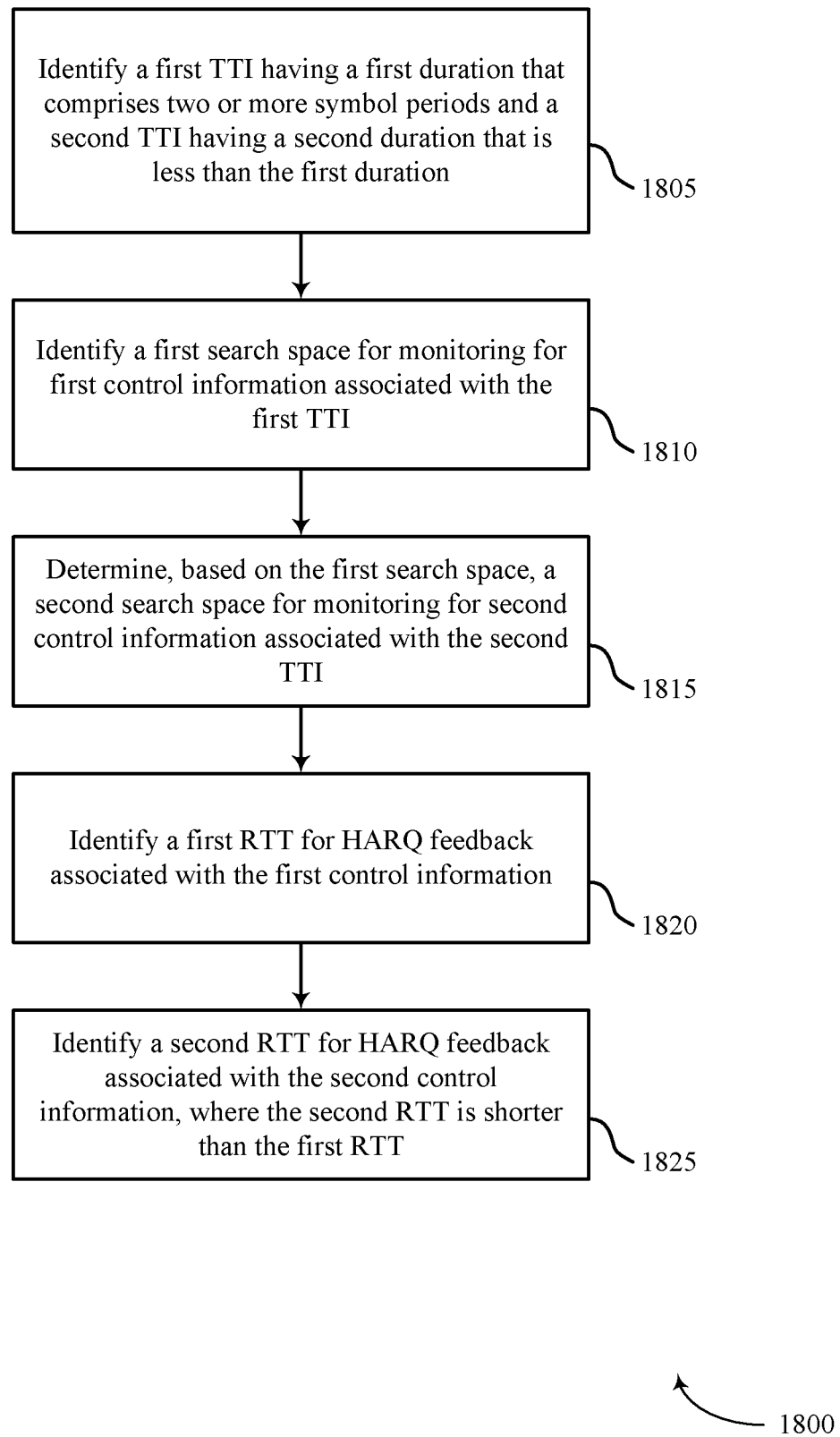

FIG. 18 shows a flowchart illustrating a method 1800 for control channel signaling with multiple TTI lengths in accordance with various aspects of the present disclosure. The operations of method 1800 may be implemented by a device such as a UE 115 or its components as described with reference to FIGS. 1 and 2. For example, the operations of method 1800 may be performed by the control information manager as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may identify a first TTI having a first duration that comprises two or more symbol periods and a second TTI having a second duration that is less than the first duration as described above with reference to FIGS. 2 through 10. In certain examples, the operations of block 1805 may be performed by the TTI duration component as described with reference to FIGS. 12 and 13.

At block 1810, the UE 115 may identify a first search space for monitoring for first control information associated with the first TTI as described above with reference to FIGS. 2 through 10. In certain examples, the operations of block 1810 may be performed by the search space component as described with reference to FIGS. 12 and 13.

At block 1815, the UE 115 may determine, based on the first search space, a second search space for monitoring for second control information associated with the second TTI as described above with reference to FIGS. 2 through 10. In certain examples, the operations of block 1815 may be performed by the search space component as described with reference to FIGS. 12 and 13.

At block 1820, the UE 115 may identify a first RTT for HARQ feedback associated with the first control information as described above with reference to FIGS. 2 through 10. In certain examples, the operations of block 1820 may be performed by the HARQ component as described with reference to FIGS. 12 and 13.

At block 1825, the UE 115 may identify a second RTT for HARQ feedback associated with the second control information, where the second RTT is shorter than the first RTT as described above with reference to FIGS. 2 through 10. In certain examples, the operations of block 1825 may be performed by the HARQ component as described with reference to FIGS. 12 and 13.

Figure 19:
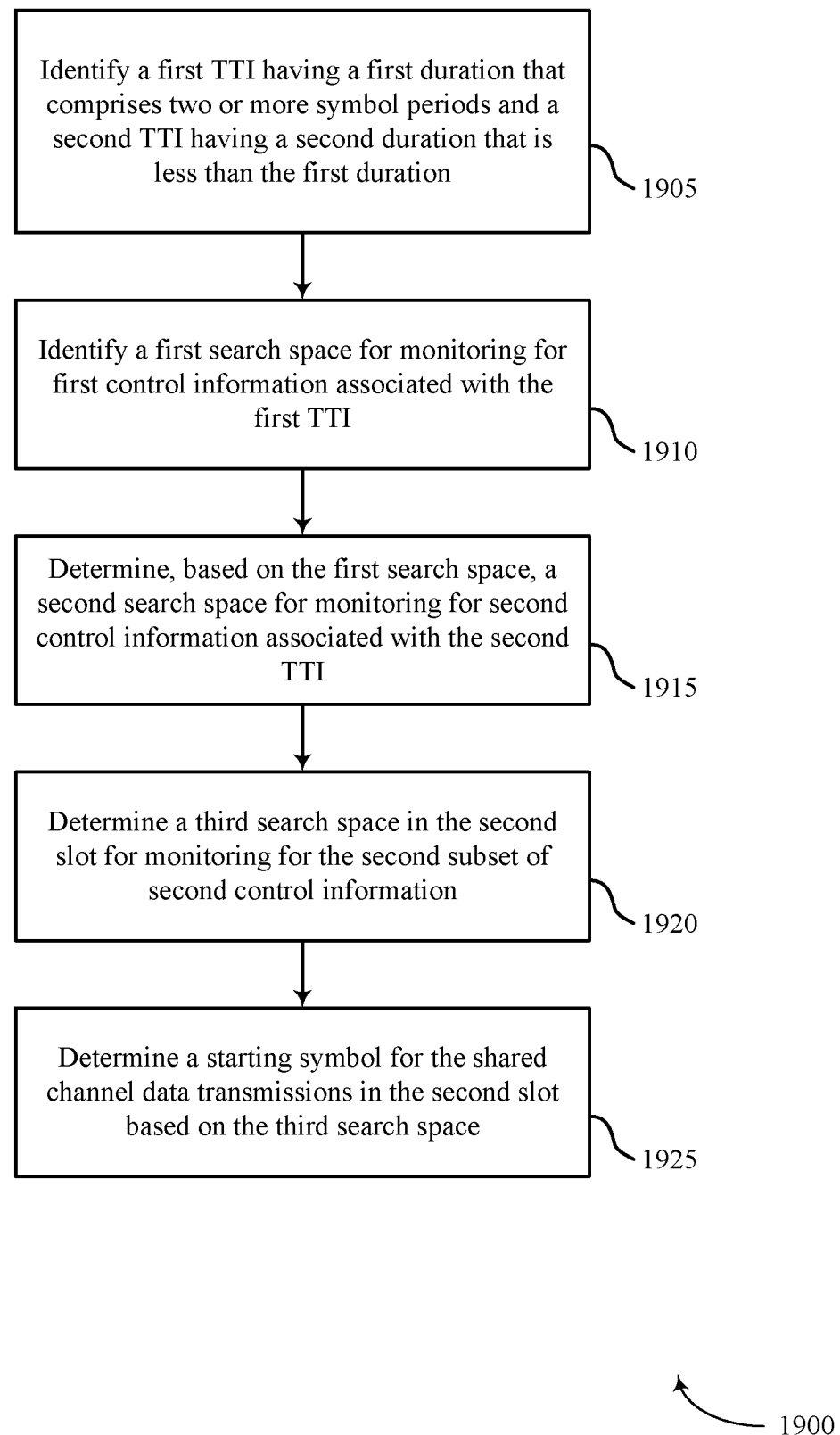

FIG. 19 shows a flowchart illustrating a method 1900 for control channel signaling with multiple TTI lengths in accordance with various aspects of the present disclosure. The operations of method 1900 may be implemented by a device such as a UE 115 or its components as described with reference to FIGS. 1 and 2. For example, the operations of method 1900 may be performed by the control information manager as described herein. In some examples, the UE 115 may execute a set of codes to control the functional elements of the device to perform the functions described below. Additionally or alternatively, the UE 115 may perform aspects the functions described below using special-purpose hardware.

At block 1905, the UE 115 may identify a first TTI having a first duration that comprises two or more symbol periods and a second TTI having a second duration that is less than the first duration as described above with reference to FIGS. 2 through 10. In certain examples, the operations of block 1905 may be performed by the TTI duration component as described with reference to FIGS. 12 and 13.

At block 1910, the UE 115 may identify a first search space for monitoring for first control information associated with the first TTI as described above with reference to FIGS. 2 through 10. In certain examples, the operations of block 1910 may be performed by the search space component as described with reference to FIGS. 12 and 13.

At block 1915, the UE 115 may determine, based on the first search space, a second search space for monitoring for second control information associated with the second TTI as described above with reference to FIGS. 2 through 10. In certain examples, the operations of block 1915 may be performed by the search space component as described with reference to FIGS. 12 and 13.

At block 1920, the UE 115 may determine a third search space in the second slot for monitoring for the second subset of second control information as described above with reference to FIGS. 2 through 10. In some cases, the second control information comprises a first subset of second control information transmitted in a first slot of a wireless transmission subframe and a second subset of second control information transmitted in a second slot of the wireless transmission subframe. In certain examples, the operations of block 1920 may be performed by the search space component as described with reference to FIGS. 12 and 13.

At block 1925, the UE 115 may determine a starting symbol for the shared channel data transmissions in the second slot based on the third search space as described above with reference to FIGS. 2 through 10. In certain examples, the operations of block 1925 may be performed by the multiplexing component as described with reference to FIGS. 12 and 13.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for control channel signaling with multiple TTI lengths.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different PHY locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for control channel signaling with multiple TTI lengths. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

What is claimed is:

1. A method of wireless communication comprising:
identifying a first transmission time interval (TTI) with a first duration that includes two or more symbol periods and a second TTI with a second duration that is less than the first duration;
identifying a first search space in a control channel resource for monitoring for first control information associated with the first TTI;
deriving, based at least in part on the location of the first search space in the control channel resource, a second search space in the control channel resource for monitoring for second control information associated with the second TTI; and
monitoring at least one of the first search space in the control channel resource for the first control information or the second search space in the control channel resource for the second control information, wherein the first control information comprises first downlink control information (DCI) having a first DCI size and a first DCI format, and the second control information comprises second DCI having a second DCI size and a second DCI format, and wherein one or more of the first DCI size and the second DCI size or the first DCI format and the second DCI format is different.

2. The method of claim 1, wherein deriving the second search space comprises:
deriving the second search space based at least in part on an offset from the first search space.

3. The method of claim 1, wherein the second search space is a subset of the first search space.

4. The method of claim 1, wherein the identifying the first search space comprises:
deriving a plurality of decoding candidates for decoding of received wireless transmissions and identification of the first control information and the second control information; and
identifying a first subset of the decoding candidates as being in the first search space.

5. The method of claim 4, wherein the deriving the second search space comprises:
identifying a second subset of the decoding candidates as being in the second search space.

6. The method of claim 5, wherein the first subset of decoding candidates and the second subset of decoding candidates are non-overlapping subsets of the plurality of decoding candidates.

7. The method of claim 4, wherein the deriving the plurality of decoding candidates is based at least in part on one or more of a user equipment (UE) network identifier, a random seed, or a total size available for control information.

8. The method of claim 7, wherein the deriving the second search space comprises:
deriving the second search space based at least in part on one or more of a second UE network identifier or a second random seed.

9. The method of claim 1, wherein the first DCI size is larger than the second DCI size.

10. The method of claim 1, wherein the first DCI size and second DCI size are the same, and wherein one or more bits of the second DCI provide different information than corresponding bits in the first DCI.

11. The method of claim 1, wherein the first DCI includes a first number of cyclic redundancy check (CRC) bits, and the second DCI includes a second number of CRC bits that is greater than the first number of CRC bits.

12. The method of claim 1, wherein the monitoring comprises:
blind decoding wireless transmissions received in the first search space for the first control information; and
blind decoding wireless transmissions received in the second search space for the second control information.

13. The method of claim 12, further comprising:
identifying a set of blind decoding candidates for blind decoding transmissions received in the second search space based at least in part on one or more of an available number of aggregation levels for second TTI transmissions or an available DCI format for the second control information.

14. The method of claim 13, wherein a different set of blind decoding candidates for the first search space is identified when transmissions using the second TTI are configured than when transmissions using the second TTI are not configured.

15. The method of claim 12, further comprising:
identifying a set of blind decoding candidates for blind decoding transmissions received in the second search space based at least in part on a round trip time (RTT) for hybrid automatic repeat request (HARQ) feedback associated with the second control information.

16. The method of claim 1, further comprising:
identifying a first RTT for HARQ feedback associated with the first control information; and
identifying a second RTT for HARQ feedback associated with the second control information, wherein the second RTT is shorter than the first RTT.

17. The method of claim 16, wherein the second RTT is determined based at least in part on a capability of a UE receiving the second control information.

18. The method of claim 17, wherein the first RTT is determined to be a legacy RTT or a shorter RTT than the legacy RTT based at least in part on the capability of the UE.

19. The method of claim 1, wherein the second control information comprises a first subset of second control information transmitted in a first slot of a wireless transmission subframe and a second subset of second control information transmitted in a second slot of the wireless transmission subframe.

20. The method of claim 19, wherein the first subset transmitted in the first slot of the wireless transmission subframe is transmitted in a control channel that is time division multiplexed with shared channel data transmissions in the first slot, and wherein second subset transmitted in the second slot of the wireless transmission subframe is transmitted in a second control channel that is both time division multiplexed and frequency division multiplexed with shared channel data transmissions in the second slot.

21. The method of claim 19, further comprising:
determining a starting symbol for the shared channel data transmissions in the second slot based at least in part on one or more of a configured starting symbol location or a symbol location of the second subset of second control information.

22. The method of claim 19, further comprising:
determining a third search space in the second slot for monitoring for the second subset of second control information; and determining a starting symbol for the shared channel data transmissions in the second slot based at least in part on the third search space.

23. The method of claim 22, wherein the third search space is determined based at least in part on a set of resource blocks (RBs) of the second slot configured for control information transmissions.

24. The method of claim 22, wherein the first search space and second search space are distributed over a system bandwidth for transmissions in the first slot, and wherein the third search space is distributed over a subset of the system bandwidth.

25. The method of claim 22, wherein the third search space is determined based at least in part on a transmission mode associated with the second control information.

26. The method of claim 19, wherein the second subset of second control information comprises one or more of physical downlink control channel (PDCCH) information or physical control format indicator channel (PCFICH) information transmitted in the second slot of the wireless transmission subframe.

27. An apparatus for wireless communication comprising:
means for identifying a first transmission time interval (TTI) with a first duration that includes two or more symbol periods and a second TTI with a second duration that is less than the first duration;
means for identifying a first search space in a control channel resource for monitoring for first control information associated with the first TTI;
means for deriving, based at least in part on the location of the first search space in the control channel resource, a second search space in the control channel resource for monitoring for second control information associated with the second TTI; and
means for monitoring at least one of the first search space in the control channel resource for the first control information or the second search space in the control channel resource for the second control information, wherein the first control information comprises first downlink control information (DCI) having a first DCI size and a first DCI format, and the second control information comprises second DCI having a second DCI size and a second DCI format, and wherein one or more of the first DCI size and the second DCI size or the first DCI format and the second DCI format is different.

28. An apparatus for wireless communication, comprising:
a processor;
memory in electronic communication with the processor; and
instructions stored in the memory and operable, when executed by the processor, to cause the apparatus to:
identify a first transmission time interval (TTI) with a first duration that includes two or more symbol periods and a second TTI with a second duration that is less than the first duration;
identify a first search space in a control channel resource for monitoring for first control information associated with the first TTI;
derive, based at least in part on the location of the first search space in the control channel resource, a second search space in the control channel resource for monitoring for second control information associated with the second TTI; and
monitor at least one of the first search space in the control channel resource for the first control information or the second search space in the control channel resource for the second control information, wherein the first control information comprises first downlink control information (DCI) having a first DCI size and a first DCI format, and the second control information comprises second DCI having a second DCI size and a second DCI format, and wherein one or more of the first DCI size and the second DCI size or the first DCI format and the second DCI format is different.

29. A non-transitory computer-readable medium storing code for wireless communication, the code comprising instructions executable to:
identify a first transmission time interval (TTI) with a first duration that includes two or more symbol periods and a second TTI with a second duration that is less than the first duration;
identify a first search space in a control channel resource for monitoring for first control information associated with the first TTI;
derive, based at least in part on the location of the first search space in the control channel resource, a second search space in the control channel resource for monitoring for second control information associated with the second TTI; and
monitor at least one of the first search space in the control channel resource for the first control information or the second search space in the control channel resource for the second control information, wherein the first control information comprises first downlink control information (DCI) having a first DCI size and a first DCI format, and the second control information comprises second DCI having a second DCI size and a second DCI format, and wherein one or more of the first DCI size and the second DCI size or the first DCI format and the second DCI format is different.

* * * * *